United States Patent

Takahama et al.

[11] Patent Number: 5,825,345
[45] Date of Patent: Oct. 20, 1998

[54] DISPLAY-INTEGRATED TYPE TABLET DEVICE

[75] Inventors: Kengo Takahama, Nara; Takao Tagawa, Kashihara; Kiyohiro Nozaki, Nara, all of Japan

[73] Assignee: Sharp Kabushiki Kaisha, Osaka, Japan

[21] Appl. No.: 690,788

[22] Filed: Aug. 1, 1996

[51] Int. Cl.[6] ..................................................... G09G 3/36
[52] U.S. Cl. ........................... 345/104; 345/173; 345/174
[58] Field of Search ..................................... 345/104, 173, 345/174; 178/18, 19

[56] References Cited

U.S. PATENT DOCUMENTS 5,357,266  10/1994  Tagawa .
5,448,024   9/1995  Kawaguchi et al. .
5,534,892   7/1996  Tagawa ..................................... 345/104

FOREIGN PATENT DOCUMENTS 06168066  6/1994  Japan .

OTHER PUBLICATIONS (No copy has been received). "TFT LCD Panel".

Primary Examiner—Kee M. Tung
Assistant Examiner—Matthew Luu
Attorney, Agent, or Firm—Birch, Stewart, Kolasch & Birch, LLP

[57] ABSTRACT

During a display period (Y-coordinate detection period), an image is written to an electro-optical material so as to form a display by driving row electrodes and column electrodes by using a row-electrode driving circuit and a column-electrode driving circuit so as to selectively operate TFTs. In this case, a shift data signal having a width corresponding to two clocks of a horizontal sync signal is supplied to the row-electrode driving circuit by using a start-pulse-width expanding circuit; therefore, two row-electrode scanning signals are simultaneously inputted to two of the corresponding row electrodes. Moreover, the row-electrode scanning signals have periods in which they instantaneously turn "off" respectively, and the turning-off timing is coincident in the respective signals. Since a Y-coordinate detection signal is detected in this manner, it becomes possible to increase an induced voltage to be exerted in a detection electrode of an electronic pen, to improve the S/N ratio of the Y-coordinate detection signal, and also to enhance the detection accuracy of the Y-coordinate.

21 Claims, 36 Drawing Sheets

LPF FREQUENCY CHARACTERISTICS

HPF FREQUENCY CHARACTERISTICS

BPF FREQUENCY CHARACTERISTICS

DISPLAY-INTEGRATED TYPE TABLET DEVICE

FIELD OF THE INVENTION

The present invention relates to an display-integrated type tablet device that is used when characters, graphics and other data are inputted to a personal computer, a word processor or other apparatus.

BACKGROUND OF THE INVENTION

For example, coordinate input devices, provided with a liquid crystal display in combination with a tablet of various kinds, have been put into practical use as a means for inputting hand-written characters and graphics to computers, word processors and other apparatuses. In the coordinate input device, characters, graphics and other data, which are written onto the tablet as if they were written on a sheet of paper by the operator, are inputted and displayed on the liquid crystal display. Display-integrated type tablet devices are one example of tablets used for this purpose. For example, as illustrated in FIG. 41, a display period (Y-coordinate detection period) T1', during which a Y-coordinate on the tablet is detected and an image is also displayed, and an X-coordinate detection period T2', during which an X-coordinate on the tablet is detected, are set in one frame period; thus, the coordinate detections and image display are operated in a time-sharing manner.

As illustrated in FIG. 40, a conventional display-integrated type tablet device has a liquid crystal display panel 151 (hereinafter, referred to simply as a display panel) of the active matrix type. The display panel 151 is provided with a plurality of row electrodes G1', G2', G3', . . . , Gn' (hereinafter, an arbitrary row electrode is referred to as G') that are arranged on a transparent TFT (thin-film transistor) substrate 160 in parallel with one another and a plurality of column electrodes S1', S2', S3', . . . , Sn' (hereinafter, an arbitrary column electrode is referred to as S') that are arranged in parallel with one another in a manner orthogonal to the group of row electrodes G'. Here, TFTs 161 are placed at intersections between row electrodes G' and column electrodes S'. The row electrode G' is connected to the gate electrode of the TFT 161 and the column electrode S' is connected to the source electrode thereof. Further, a plurality of pixel electrodes 162 are connected to respective drain electrodes of the TFTs 161. Each pixel electrode 162 is disposed in an area surrounded by the corresponding row electrode G' and column electrode S'; thus, the pixel electrodes 162, as a whole, are disposed in a matrix form.

An opposing substrate 163, which faces the TFT substrate 160, is placed on the rear-surface side of the TFT substrate 160, and an opposing electrode 164, which covers virtually the same area as the TFT substrate 160, is installed on the inside surface of the opposing substrate 163. In other words, the opposing electrode 164 is placed between the TFT substrate 160 and the opposing substrate 163. Further, liquid crystal is interpolated between the pixel electrodes 162 and the opposing electrode 164 so as to form a pixel matrix. Here, an opposing electrode driving circuit 165 is connected to the opposing electrode 164, and a bias voltage is thus applied thereto through a power supply circuit 166 and the opposing electrode driving circuit 165.

Moreover, the display-integrated type tablet device is provided with a row-electrode driving circuit 152 and a column-electrode driving circuit 153 that are used for driving the display panel 151. The group of row electrodes G' are connected to the row-electrode driving circuit 152 and the group of column electrodes S' are connected to the column-electrode driving circuit 153. In order to control the row-electrode driving circuit 152 and the column-electrode driving circuit 153, the display-integrated type tablet device is further provided with a display control circuit 154, a detection control circuit 155, and a switching circuit 158. The display control circuit 154 supplies a display-controlling signal to the row-electrode driving circuit 152 and the column-electrode driving circuit 153, and the detection control circuit 155 supplies a detection-controlling signal to the column-electrode driving circuit 153. The switching circuit 158, which is controlled by a control circuit 159 that will be described later, switches operations between an image-displaying operation and a coordinate-detecting operation.

Moreover, the display-integrated type tablet device has an electronic pen 156 for detecting a position on the display panel 151. The electronic pen 156 has a detection electrode at its top that has high input impedance and that is coupled with the row electrode G' and the column electrode S' on the display panel 151 through a stray capacity. A coordinate detection circuit 157, connected to the electronic pen 156, detects the coordinates of the top of the electronic pen 156 on the display panel 151 upon receipt of a signal from the electronic pen 156. The control circuit 159 controls the coordinate detection circuit 157 and the switching circuit 158 so as to carry out an image-displaying operation and a coordinate-detection operation.

As illustrated in FIG. 41, during the display period (Y-coordinate detection period) T1', the row-electrode driving circuit 152 successively applies scanning pulses of the row-electrode scanning signals g1' to gn' (hereinafter, an arbitrary row-electrode scanning signal is referred to as g') to the row electrodes G' on the display panel 151, thereby scanning the row electrodes G'. In synchronism with the scanning of the row electrodes G', the column-electrode driving circuit 153 applies to the column electrodes S' driving pulses of column-electrode driving signals sa1' to san', each having a voltage level corresponding to the display contents of a pixel related to the row electrode G' in question. Further, in an separate manner from the scanning of the row electrodes G', during the X-coordinate detection period T2', the column-electrode driving circuit 153 successively applies to the column electrodes S' scanning pulses of column-electrode scanning signals sb1' to sbn', thereby scanning the column electrodes S'. The column-electrode signals s1' to sn' are formed by the column-electrode driving signals sa1' to san' and the column-electrode scanning signals sb1'to sbn'. Here, FIG. 41 shows, for example, inputted signals that are obtained when six row electrodes G' and six column electrodes S' are respectively used.

Additionally, the scanning pulses generated by the row-electrode driving circuit 152 and the driving pulses and the scanning pulses generated by the column-electrode driving circuit 153 are generated by a supply voltage from the power supply circuit 166.

With this arrangement, an induced voltage is generated on the detection electrode of the electronic pen 156 due to the scanning pulses applied to the row electrodes G' or due to the scanning pulses applied to the column electrodes SI. Then, the coordinate detection circuit 157 detects the timing of generation of the induced voltage on the detection electrode in accordance with a coordinate-detection timing signal from the control circuit 159, thereby detecting the coordinates of the top of the electronic pen 156.

When the coordinates of the top of the electronic pen 156 are detected by the coordinate detection circuit 157, an X-coordinate detection signal and a Y-coordinate detection signal, which indicate the coordinates in question, are released from the coordinate detection circuit 157. Then, a display data signal, which is used for displaying a point image at the top position of the electronic pen 156 on the display panel 151, is generated in accordance with the X-coordinate detection signal and the Y-coordinate detection signal, and inputted to the display control circuit 154. Consequently, the display control circuit 154 is selected by the switching circuit 158 that is controlled by the control circuit 159, and thereafter, a point image is displayed at the top position of the electronic pen 156 on the display panel 151 through the operations of the display control circuit 154, the row-electrode driving circuit 152 and the column-electrode driving circuit 153.

In this manner, the user is allowed to write characters, symbols and drawings on the display panel 151 by the use of the electronic pen 156, as if he were writing them on paper using writing instruments. In addition to this function, since inputted characters and inputted symbols are recognized through changes in the X-coordinate detection signal and the Y-coordinate detection signal, it is possible to carry out document management, control instructions, and other operations by using the results of recognition.

However, the above-mentioned conventional display-integrated type tablet device has the following three problems:

First, as illustrated in FIG. 41, during a period of one cycle of a horizontal synchronous signal H within the display period (Y-coordinate detection period) T1', the row-electrode scanning signal g' is merely applied to one row electrode G'. Further, in order to improve display quality of the display panel 151, the width of the row electrode G' on the TFT substrate 160 is made as thin as possible so that the aperture rate of the pixel electrode 162 is increased as great as possible. For this reason, the electrostatic coupling capacity between one row electrode G' and the detection electrode on the top of the electronic pen 156 is reduced to a very small value, resulting in a very weak detection signal. This fails to provide a sufficient S/N ratio, causing degradation in the coordinate-detecting accuracy.

Secondly, since the electrostatic coupling capacity between the detection electrode of the electronic pen 156 and the row electrode G' or the column electrode S' on the TFT substrate 160 is small, the probability of erroneous coordinate detection of the electronic pen 156 tends to become higher when an electrostatic interfering noise source exists near the electronic pen 156. Therefore, in such a case when a mode-switching operation is carried out by a computer or other apparatus based upon the detected coordinates, serious malfunction might occur.

Thirdly, a protection panel for preventing scratch during operation of the electronic pen 156 is placed between the display panel 151 and the electronic pen 156. Since the anti-scratch protection panel is distorted by pressure applied during the operation of the electronic pen 156, the distance between the detection electrode of the electronic pen 156 and the electrode of the display panel 151 is also changed. This results in a change in the electrostatic coupling capacity, thereby causing a variation in the level of the coordinate signal. Here, the coordinate signal is inputted to a comparator, and extracted as a coordinate detection signal that has been formed into pulses using a threshold value; therefore, when the level of the coordinate signal varies, the center position of the pulsed coordinate detection signal also fluctuates.

SUMMARY OF THE INVENTION

The first objective of the present invention is to provide a display-integrated type tablet device wherein the electrostatic coupling capacity between row electrodes and an electrode on the top of an electronic pen is increased by supplying scanning signals simultaneously to at least not less than two row electrodes. The second objective of the present invention is to provide a display-integrated type tablet device which is capable of detecting interfering noise externally mingled. The third objective of the present invention is to provide a display-integrated type tablet device which is capable of preventing fluctuations in its coordinate detection signal by using an optimized frequency transmitting circuit.

In order to achieve the first objective, the display-integrated type tablet device of the present invention is provided with: a pair of transparent substrates that are placed face to face with each other with an electro-optical material being interpolated in between; a plurality of first electrodes that are disposed on one surface of the transparent substrate in parallel with one another; a plurality of second electrodes that are disposed in parallel with one another in a manner orthogonal to the first electrodes; a plurality of switching elements, each being disposed at an intersecting position between the corresponding first and second electrodes and connected to the corresponding first and second electrodes; a plurality of pixel electrodes that are disposed in a matrix form, each being connected to the corresponding switching elements; first and second electrode driving circuit for driving the first and second electrodes; an input pen that is electrostatically coupled with the first and second electrodes; a first positional-information detection circuit which, during a display period in which an image is written to the electro-optical material and a resulting display is made by selectively operating the switching elements by allowing the first and second electrode driving circuit to drive the first and second electrodes, detects first positional-information that indicates an input position by the input pen when the first electrodes are driven; and a second positional-information detection circuit which, during a period except for the display period, detects second positional-information that indicates an input position by the input pen when the second electrodes are driven. This arrangement is characterized in that the first electrode driving circuit, upon driving the first electrodes, outputs scanning signals so that a potential change is exerted in each of the first electrodes so as to detect the first positional-information, and also inputs the scanning signals to the corresponding first electrodes so that a potential change is simultaneously generated in at least two of the first electrodes. Further, the scanning signal is provided with a transfer speed for scanning only the electrode-to-electrode distance corresponding to one of the first electrodes per unit time of a basic clock for driving the first electrode driving means.

With the above-mentioned arrangement, during the display period, the first and second electrodes are driven by the first and second electrode driving circuits so that the switching elements are selectively operated, and an image is written to the electro-optical material. At this time, the first electrode driving circuit inputs to the first electrodes scanning signals that exert a potential change in each of the first electrodes. Since the first electrodes and the input pen are electrostatically coupled, an induced voltage is exerted in the input pen due to the potential change. The first positional-information detection circuit detects a position at which the induced voltage has been exerted as the first positional information.

In this case, since the scanning signals are simultaneously inputted to at least two of the first electrodes, it is possible to increase the electrostatic coupling capacity that is generated between the input pen and the first electrodes, compared with conventional arrangements wherein the scanning signals are inputted to the first electrodes one by one. This makes it possible to exert a greater induced voltage in the input pen than in the conventional arrangements. As a result, the signal to be inputted from the input pen to the first positional-information detection circuit becomes greater, thereby providing a higher S/N ratio as well as making it possible to obtain the first positional information with high accuracy.

In order to achieve the second objective, in addition to the above-mentioned arrangement, the display-integrated type tablet device of the present invention is further provided with an interfering-noise detection circuit which detects interfering noise externally merged, during a period except for the driving periods of the first and second electrodes.

The feature of this arrangement is explained as follow: When the first and second electrodes are driven, an induced voltage is exerted between the input pen and the first electrodes or the second electrodes. The first and second positional information, which indicates the position of the input pen on the transparent substrate, is obtained by detecting this voltage by using the first and second positional-information detection circuit. At this time, since the electrostatic coupling capacity between the input pen and the first electrodes or the second electrodes is small, erroneous detection tends to be caused in the first and second positional information, if an electrostatic interfering noise source exists near the device.

In order to solve this problem, the presence or absence of an electrostatic interfering noise source is detected by installing the interfering-noise detection circuit which detects interfering noise externally merged, during a period except for the driving periods of the first and second electrodes. Thus, judgement is made as to the reliability of the first and second positional information, and if there is an electrostatic interfering noise source, the results of the judgement is utilized for compensation and interpolation for the coordinates that have been erroneously detected due to the interfering noise.

In order to achieve the third objective, in the display-integrated type tablet device of the present invention having the above-mentioned arrangement, the first positional-information detection circuit is further provided with the first frequency-transmitting circuit which extracts a signal from the input pen with a predetermined frequency band and the first comparison circuit which detects the first positional information by comparing the signal that has passed through the first frequency-transmitting circuit with a threshold value. Further, the second positional-information detection circuit is further provided with the second frequency-transmitting circuit which extracts a signal from the input pen with a predetermined frequency band and the second comparison circuit which detects the second positional information by comparing the signal that has passed through the second frequency-transmitting circuit with a threshold value. The feature of this arrangement is that the first or second frequency-transmitting circuit is set so that in the waveform of each signal that has passed through the frequency-transmitting circuit, the rate of change in the rising time in the vicinity of the threshold value and the rate of change in the falling time in the vicinity of the threshold value have absolute values that are equal to each other with polarities reversed to each other.

The effects of this arrangement are explained as follows: When the first and second electrodes are driven, an induced voltage is exerted between the input pen and the first electrodes or the second electrodes. A signal derived from this voltage is inputted to the first positional-information detection circuit, and extracted as a signal having a predetermined frequency band through the first frequency transmitting circuit. Then, the resulting signal is compared with a threshold value in the first comparison circuit so as to detect the first positional information.

In this case, in the waveform of the signal that has passed through the first frequency-transmitting circuit, the rate of change in the rising time in the vicinity of the threshold value and the rate of change in the falling time in the vicinity of the threshold value are optimized to have absolute values that are equal to each other with polarities reversed to each other; therefore, even if the signal is fluctuated by a low-frequency-band component, no time-wise fluctuation is caused in the first positional information.

Since the second positional information is also obtained through the same processes as the first positional information, no time-wise fluctuation is caused in the second positional information, either. Thus, it becomes possible to detect coordinates with high accuracy, even under intensity-fluctuations in positional information and noise with low frequencies.

For a fuller understanding of the nature and advantages of the invention, reference should be made to the ensuing detailed description taken in conjunction with the accompanying drawings.

BRIEF DESCRIPTION OF THE DRAWING

FIG. 30($b$) is a graph showing frequency characteristics of HPF; and FIG. 30($c$) is a graph showing frequency characteristics of BPF.

DESCRIPTION OF THE EMBODIMENT

Referring to FIGS. 1 through 39, the following description will discuss one embodiment of the present invention.

Figure 1:
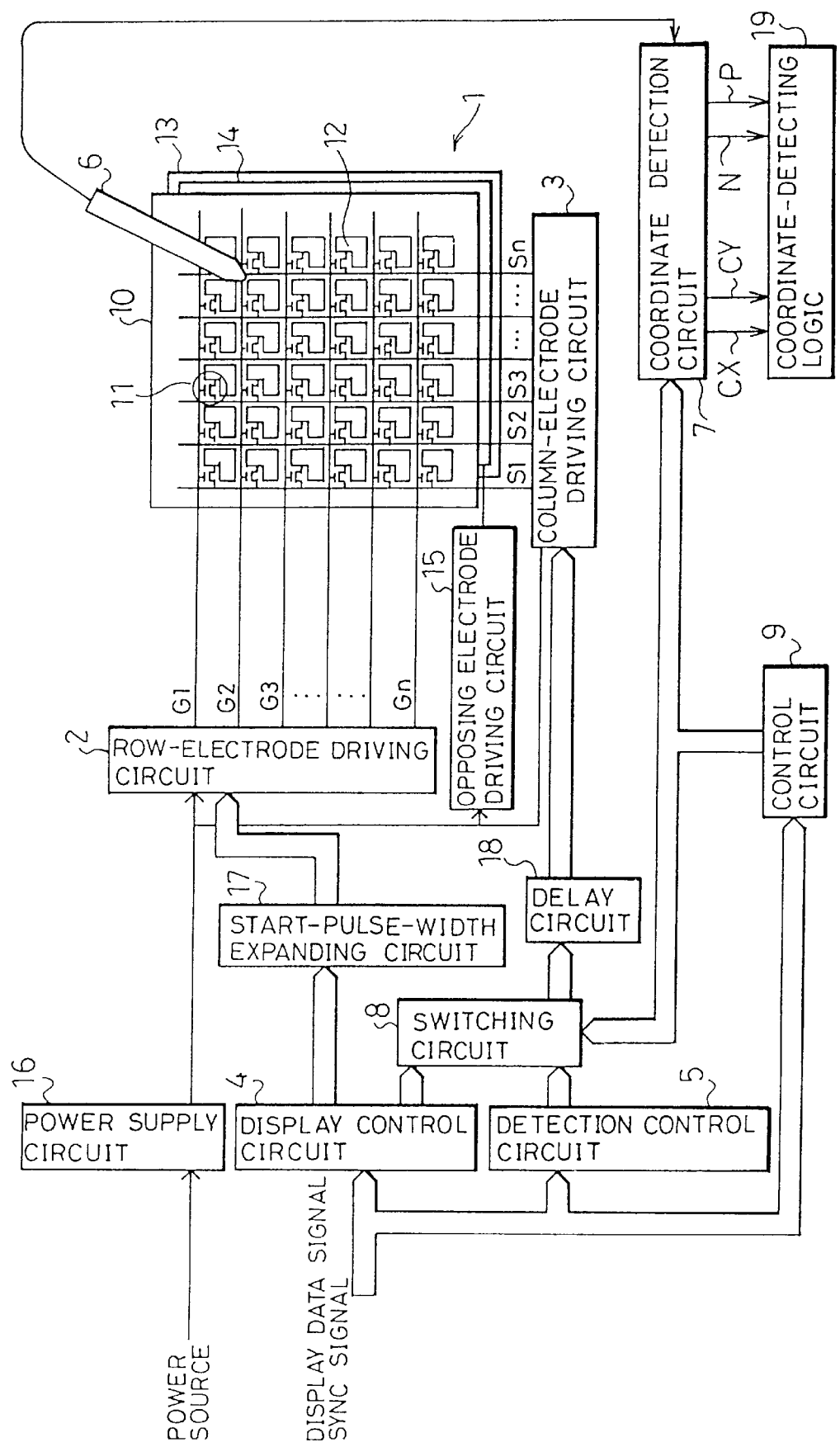
FIG. 1 is a block diagram showing an arrangement of a display-integrated type tablet device of one embodiment of the present invention.

As illustrated in FIG. 1, a display-integrated type tablet device of the present embodiment has a liquid crystal display panel 1 (hereinafter, referred to simply as a display panel) of the active matrix type. The display panel 1 is provided with a plurality of row electrodes G1, G2, G3, . . . , Gn (hereinafter, an arbitrary row electrode is referred to as G) that are provided as the first electrodes and that are arranged on a transparent TFT (thin-film transistor) substrate 10 in parallel with one another and a plurality of column electrodes S1, S2, S3, . . . , Sn (hereinafter, an arbitrary column electrode is referred to as S) that are provided as the second electrodes and that are arranged in parallel with one another in a manner orthogonal to the group of row electrodes G. Here, a plurality of TFTs 11 (switching elements) are placed at intersections between row electrodes G and column electrodes S. The row electrode G is connected to the gate electrode of the TFT 11 and the column electrode S is connected to the source electrode thereof. Further, a plurality of pixel electrodes 12 are connected to respective drain electrodes of the TFTs 11. Each pixel electrode 12 is disposed in an area surrounded by the corresponding row electrode G and column electrode S; thus, the pixel electrodes 12, as a whole, are disposed in a matrix form.

An opposing substrate 13, which is provided as a transparent substrate facing the TFT substrate 10, is placed on the rear-surface side of the TFT substrate 10, and an opposing electrode 14, which covers virtually the same area as the TFT substrate 10, is installed on the inside surface of the opposing substrate 13. In other words, the opposing electrode 14 is placed between the TFT substrate 10 and the opposing substrate 13. Further, liquid crystal that functions as an electro-optical material is interpolated between the pixel electrodes 12 and the opposing electrode 14 so as to form a pixel matrix. Here, an opposing electrode driving circuit 15 (an opposing electrode driving means) is connected to the opposing electrode 14, and a bias voltage is thus applied thereto through a power supply circuit 16 and the opposing electrode driving circuit 15.

Moreover, the display-integrated type tablet device is provided with a row-electrode driving circuit 2 (first electrode driving means) and a column-electrode driving circuit 3 (second electrode driving means) that are used for driving the display panel 1. The group of row electrodes G are connected to the row-electrode driving circuit 2 and the group of column electrodes S are connected to the column-electrode driving circuit 3. In order to control the row-electrode driving circuit 2 and the column-electrode driving circuit 3, the display-integrated type tablet device is further provided with a display control circuit 4, a detection control circuit 5, and a switching circuit 8. The display control circuit 4 (display control means) supplies a display-controlling signal to the row-electrode driving circuit 2 and the column-electrode driving circuit 3, and the detection control circuit 5 supplies a detection-controlling signal to the column-electrode driving circuit 3. The switching circuit 8, which is controlled by a control circuit 9 that will be described later, switches operations between an image-displaying operation and a coordinate-detecting operation.

In the present embodiment, a start-pulse-width expanding circuit 17 (start-pulse-width expanding means) is installed between the display control circuit 4 and the column-electrode driving circuit 2 so that scanning pulses are simultaneously applied to two of the row electrodes G. Further, a delay circuit 18 (delay means), which delays display data by one cycle (1H) in a horizontal sync signal H (see FIG. 6) that will be described later, is installed between the switching circuit 8 and the column-electrode driving circuit 3; thus, display data, released from the display control circuit 4, is transmitted to the column-electrode driving circuit 3 with a delay of 1H.

Figure 12:
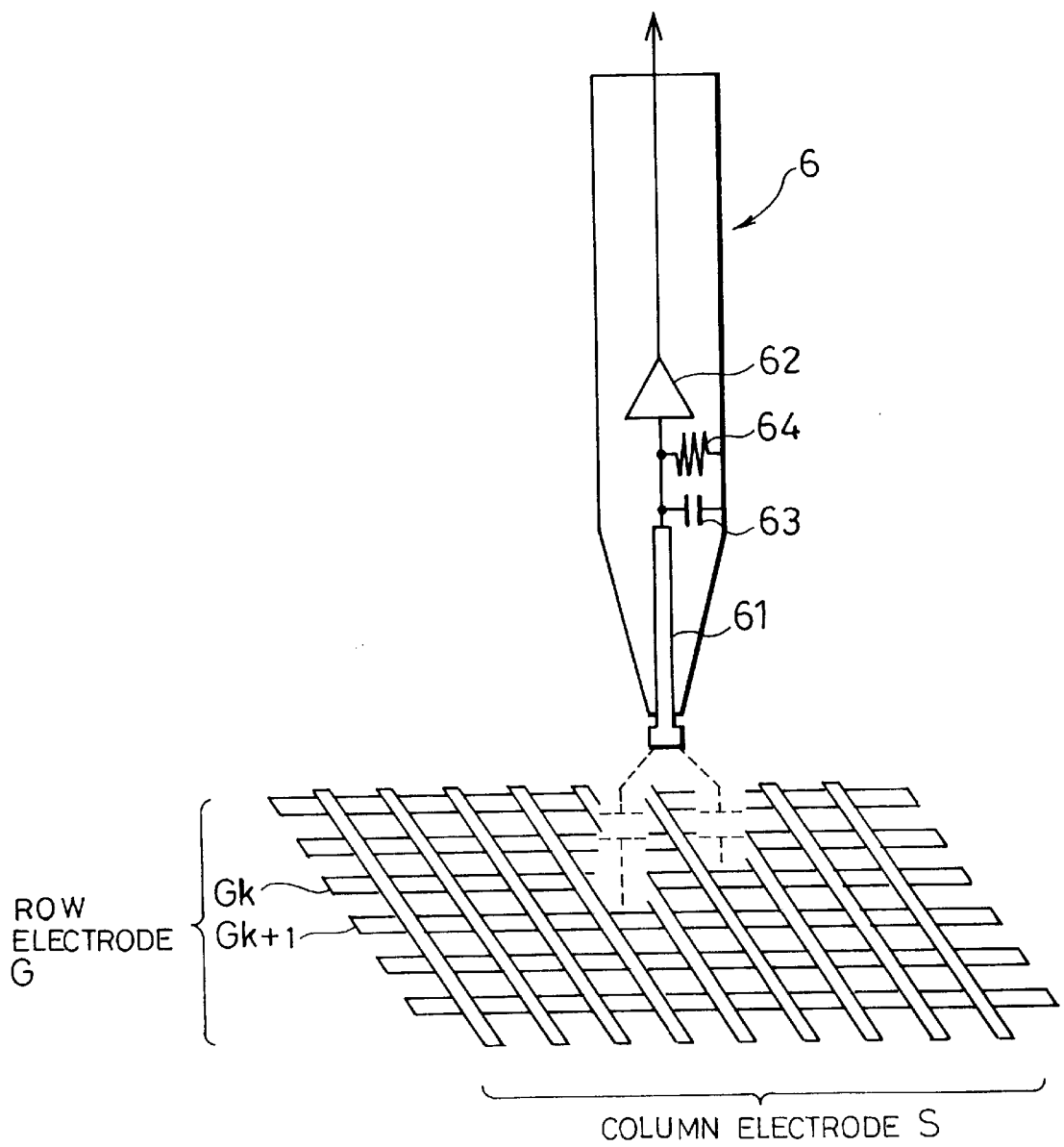
FIG. 12 is schematic view that shows a construction of an electronic pen and that also shows a coupled state between the electronic pen and the display panel when row-electrodes are being scanned.

Moreover, the display-integrated type tablet device has an electronic pen 6 (input means) for detecting a position on the display panel 1. The electronic pen 6 has a detection electrode 61 (which is shown in FIG. 12 and which will be described later) at its top that has high input impedance and that is coupled with the row electrode G and the column electrode S on the display panel 1 through a stray capacity. A coordinate detection circuit 7, connected to the electronic pen 156, detects the coordinates of the top of the electronic pen 6 on the display panel 1 upon receipt of a signal from the electronic pen 6. The control circuit 9 (control means) controls the coordinate detection circuit 7 and the switching circuit 8 so as to carry out an image-displaying operation and a coordinate-detecting operation. A coordinate-detecting logic 19 detects the coordinate values of the top that have been obtained by the coordinate detection circuit 7 as counted values.

Figure 6:
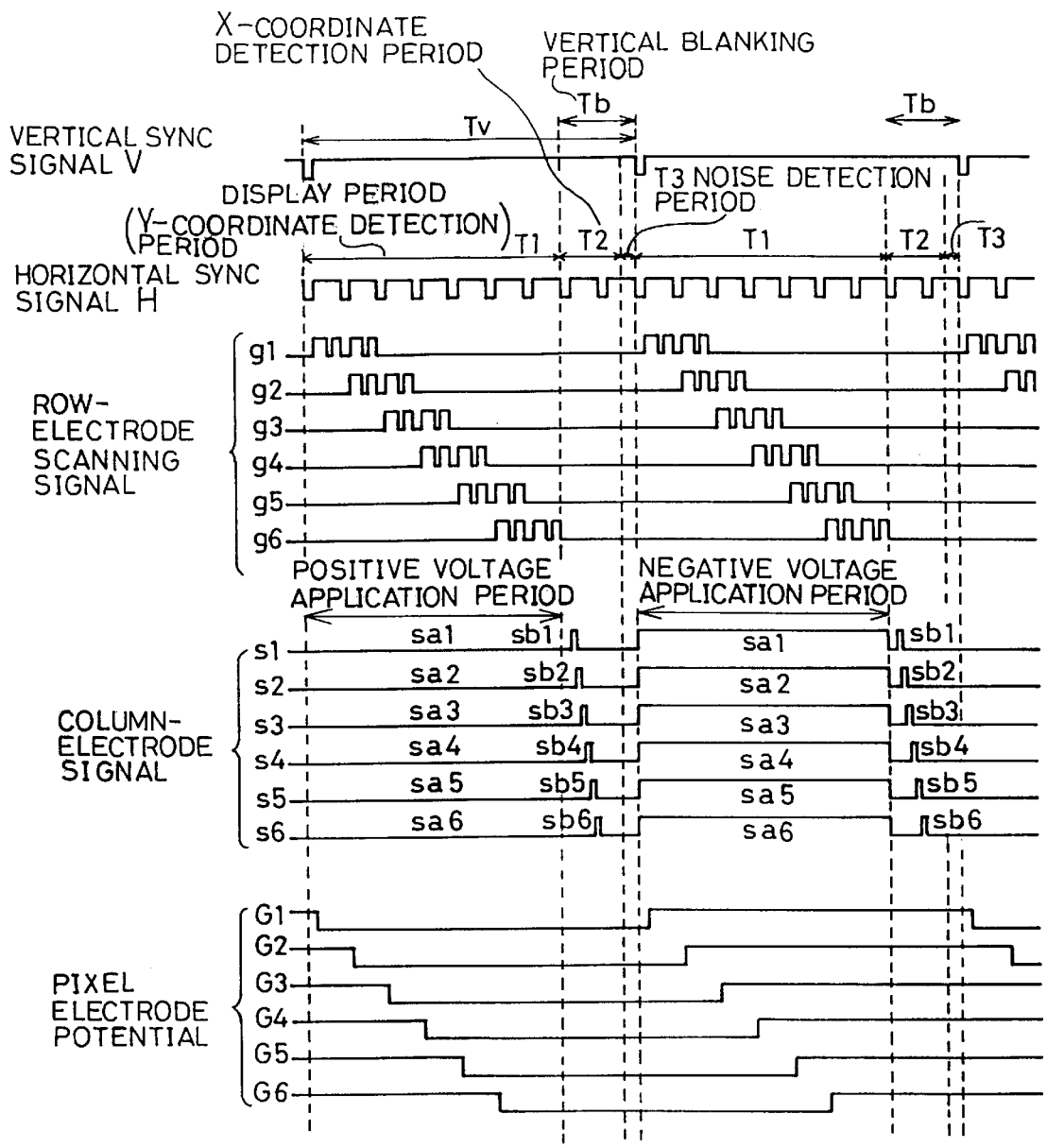
FIG. 6 is a timing chart showing operations of the display-integrated type tablet device.

The row-electrode driving circuit 2 successively applies scanning pulses of the row-electrode scanning signals g1 to gn, shown in FIG. 6, (hereinafter, an arbitrary row-electrode scanning signal is referred to as g) to the row electrodes G on the display panel 1, thereby scanning the row electrodes G. In synchronism with the scanning of the row electrodes G, the column-electrode driving circuit 3 applies to the column electrodes S driving pulses of column-electrode driving signals sa1 to san (hereinafter, an arbitrary column-electrode driving signal is referred to as sa), each having a voltage level corresponding to the display contents of a pixel related to the row electrode G in question. Further, in an separate manner from the scanning of the row electrodes G, the column-electrode driving circuit 3 successively applies to the column electrodes S scanning pulses of column-electrode scanning signals sb1 to sbn (hereinafter, an arbitrary column-electrode scanning signal is referred to as sb), thereby scanning the column electrodes S. Column-electrode signals s1 to sn (hereinafter, an arbitrary column-electrode signal is referred to as s) are formed by the column-electrode driving signals sa1 to san and the column-electrode scanning signals sb1 to sbn. Here, FIG. 6 shows, for example, inputted signals that are obtained when six row electrodes G and six column electrodes S are respectively used.

Additionally, the scanning pulses generated by the row-electrode driving circuit 2 and the driving pulses and scanning pulses generated by the column-electrode driving circuit 3 are generated by a supply voltage from the power supply circuit 16.

With this arrangement, as shown in FIG. 1, an induced voltage is generated on the detection electrode 61 of the electronic pen 6 due to the scanning pulses applied to the row electrodes G or due to the scanning pulses applied to the column electrodes S. Then, the coordinate detection circuit 7 detects the timing of generation of the induced voltage on the detection electrode 61 in accordance with a coordinate-detection timing signal from the control circuit 9, thereby detecting the coordinates of the top of the electronic pen 6.

When the coordinates of the top of the electronic pen 6 are detected by the coordinate detection circuit 7, an X-coordinate detection signal CX and a Y-coordinate detection signal CY, which indicate the coordinates in question, are released from the coordinate detection circuit 7. Then, a display data signal, which is used for displaying a point image at the top position of the electronic pen 6 on the display panel 1, is generated in accordance with the X-coordinate detection signal CX and the Y-coordinate detection signal CY, and inputted to the display control circuit 4. Consequently, the display control circuit 4 is selected by the switching circuit 8 that is controlled by the control circuit 9, and thereafter, a point image is displayed at the top position of the electronic pen 6 on the display panel 1 through the operations of the display control circuit 4, the row-electrode driving circuit 2 and the column-electrode driving circuit 3.

In this manner, the user is allowed to write characters, symbols and drawings on the display panel 1 by the use of the electronic pen 6, as if he or she were writing them on paper using writing instruments. In addition to this function, since inputted characters and inputted symbols are recognized through changes in the X-coordinate detection signal CX and the Y-coordinate detection signal CY, it is possible to carry out document management, control instructions, and other operations by using the results of recognition. Further, the electronic pen 6 can be used as a responding means to icons displayed on the display panel 1.

Referring to a timing chart in FIG. 6, the following description will discuss operations of the display-integrated type tablet device in detail.

Sync signals, which are inputted to the display control circuit 4, the detection control circuit 5 and the control circuit 9, are a vertical sync signal V and a horizontal sync signal H. The vertical sync signal V has a period corresponding to a repetitive cycle of a one-screen displaying operation and a coordinate-detecting operation, and the horizontal sync signal H has a cycle corresponding to one horizontal screen-displaying period. Here, one horizontal screen-displaying period corresponds to one clock cycle (1H) of the horizontal sync signal H, which forms a period during which image data corresponding to one horizontal row is displayed on the display panel 1. In the present embodiment, nine cycles of the horizontal sync signal H are equivalent to one cycle Tv of the vertical sync signal V.

One cycle Tv of the vertical sync signal V is divided into a one-screen display period (Y-coordinate detection period) T1, an X-coordinate detection period T2, and a noise detection period T3. The combined period of the X-coordinate detection period T2 and the noise detection period T3 is equal to a vertical blanking period Tb, which is a period during which no row-electrode scanning signal g is applied to the row electrode G. In the present embodiment, seven cycles out of the nine cycles of the horizontal sync signal H are allocated to the display period (Y-coordinate detection period) T1, and the remaining two cycles are allocated to the X-coordinate detection period T2 and the noise detection period T3.

Here, time-sharing operations among the display period (Y-coordinate detection period) T1, the X-coordinate detection period T2, and the noise detection period T3 are carried out by making a switchover and selection between the display control circuit 4 and the detection control circuit 5 by the use of the switching circuit 8.

Referring to FIGS. 1 and 6, the following description will discuss operations during the display period (Y-coordinate detection period) T1, the X-coordinate detection period T2, and the noise detection period T3.

When the switching circuit 8 is switched onto the display control circuit 4 side by a control signal from the control circuit 9, the display period (Y-coordinate detection period) T1 is on. Then, the row-electrode driving circuit 2 successively applies to the respective row electrodes G a scanning pulse of the row-signal scanning signal g that is generated in synchronized timing with a rise and a fall in one cycle of the horizontal sync signal H from the display control circuit 4, with an expanded pulse width only during one cycle of the horizontal sync signal H, thereby scanning the row electrodes G. In other words, in the present embodiment, during one cycle of the horizontal sync signal H within the display period (Y-coordinate detection period) T1, the scanning pulses are simultaneously applied to two of the row electrodes G (for example, G1 and G2).

Thus, the voltage of the scanning pulses is applied to the gate electrodes of the TFTs 11 through the two row electrode G, thereby turning the TFTs 11 on. However, the scanning pulse, which is applied to the row electrode G, is not applied in such a manner as to keep the TFT 11 always "on" during two cycles of the horizontal sync signal H. Since it is provided with notches at two portions providing negligible times in the respective two cycles of the horizontal sync signal H, the TFT 11 is allowed to turn "off" instantaneously.

In synchronism with the scanning of the row electrodes G, the column-electrode driving circuit 3, on the other hand, applies to the column electrodes S driving pulses of the column-electrode driving signals sa having voltage levels corresponding to the contents of display of pixels related to the row electrode G in question. Then, the voltage of the driving pulses is applied to the source electrodes of the TFTs 11 through the column electrodes S so that signal voltages are applied to the pixel electrodes 12 connected to the drain electrodes of the TFTs 11. At this time, the TFTs 11 are kept "on" by the scanning of the two row electrodes G carried out by the row-electrode driving circuit 2 as described above.

Figure 11:
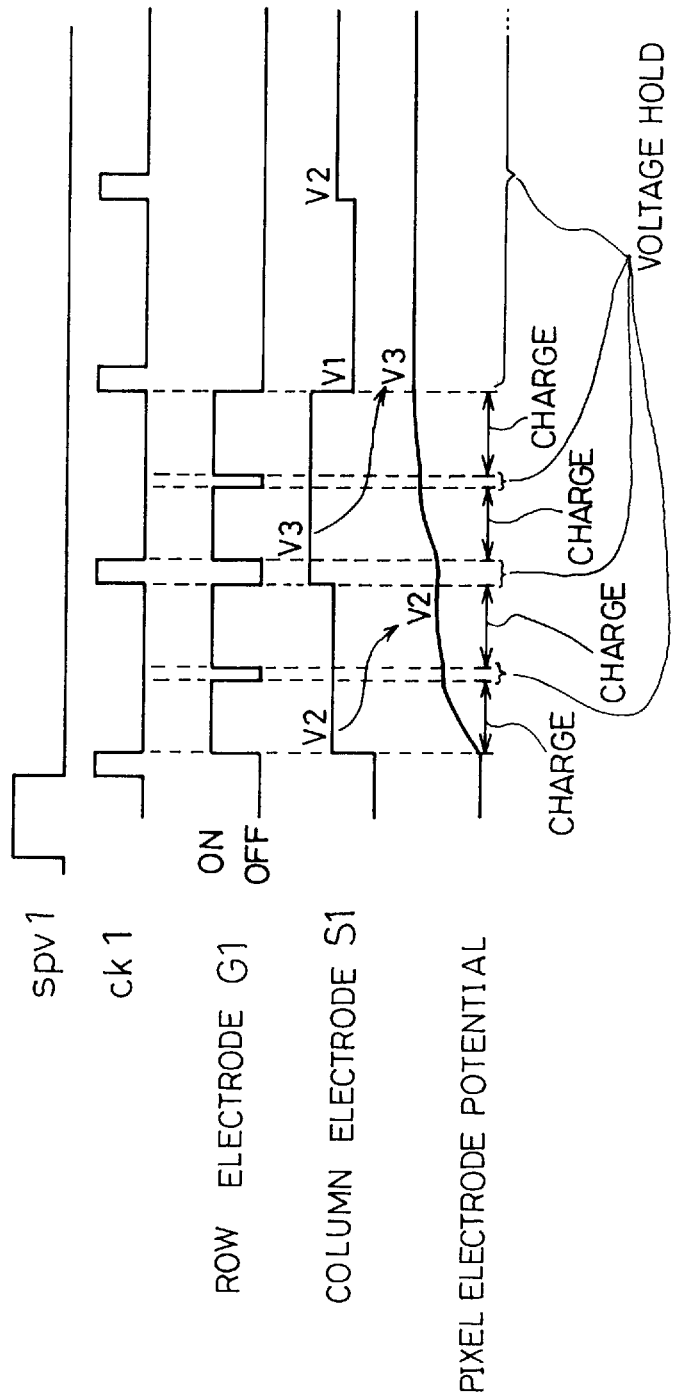
FIG. 11 is a timing chart showing a charging operation to the liquid crystal of a display panel in the display-integrated type tablet device.

As illustrated in FIG. 11, for example, the scanning pulse of the row-electrode scanning signal g1, which has been applied to the row electrode G1, keeps the TFT 11 "on" during two cycles of the horizontal sync signal H as described above, and during the first cycle of the scanning pulse, a voltage V2 of the column-electrode driving signal sa1 that has been applied to the column electrode S1 is first charged to the pixel electrode 12 that is connected to the drain electrode of the TFT 11. Further, during the second cycle, a voltage V3 that has been applied to the column electrode S1 is charged to the pixel electrode 12. Even after the row-electrode scanning signal g1 has gone "Low", that is, the TFT 11 has turned "off", the pixel electrode 12 holds the last electric potential since it forms a capacitor together with the opposing electrode 14 with the liquid crystal located in between. In other words, in FIG. 11, the pixel electrode 12 holds the voltage V3.

Here, the scanning pulse, which is applied to the row electrode G during two cycles of the horizontal sync signal H, has two short "off" times during the "on" time. However, since each short "off" time hardly gives any effects on the quantity of charge to be charged to the pixel electrode 12, the short "off" time does not give any adverse effects on display quality. Thus, an image is written to the pixels in accordance with the contents of the applied voltages.

Coinciding with this operation, each short "off" time of the scanning pulse, which is contained in the row-electrode scanning signal g that is applied to the row electrode G, exerts an induced voltage in the detection electrode 61 of the electronic pen 6. At this time, in the present embodiment, the two row-electrodes G are simultaneously subjected to the voltage change; therefore, the first induced voltage that is greater than that in a conventional arrangement is induced in the detection electrode 61. Then, the coordinate detection circuit 7 senses the timing of the first induced voltage, and detects the Y-coordinate of the top of the electronic pen 6.

In other words, during the above-mentioned display period (Y-coordinate detection period) T1, the scanning pulses of the row-electrode scanning signal g that have been successively applied to the row electrodes G are used as scanning pulses for use in image display and as scanning pulses for use in Y-coordinate detection.

Further, since, during the display period (Y-coordinate detection period) T1, the opposing electrode driving circuit 15 has made the polarity of the applied voltage reversed in synchronism with the horizontal sync signal H at the same time, the second induced voltage (a polarity-inverted signal), which is greater than the first induced voltage, is generated in the electronic pen 6. Therefore, the coordinate detection circuit 7 detects the second induced voltage, and outputs the resulting voltage to the coordinate-detecting logic 19 as a panel-proximity detection signal P. The panel-proximity detection signal P is utilized as a signal that indicates that the electronic pen 6 comes close to the display panel 1.

Next, when the switching circuit 8 is switched onto the detection control circuit 5 side by a controlling signal from the control circuit 9, the sequence proceeds to the X-coordinate detection period T2. Then, the column-electrode driving circuit 3 generates a column-electrode scanning signal sb. Here, for example, during 1.5 cycles of the horizontal sync signal H, the scanning pulses of the column-electrode scanning signals sb are successively applied to six column electrodes S so as to scan them. In this case, the pulse width of the column-electrode scanning signal sb is set to a ¼ of the pulse width of the horizontal scanning signal H.

At this time, the scanning pulse of the column-electrode scanning signal sb, applied to the column electrode S from the column-electrode driving circuit 3, exerts a third induced voltage in the detection electrode 61 of the electronic pen 6. The coordinate detection circuit 7 senses the timing of generation of the third induced voltage, and detects the X-coordinate of the top of the electronic pen 6. In other words, during the X-coordinate detection period T2, the scanning pulses that have been successively applied to the column electrodes S are utilized as scanning pulses for use in X-coordinate detection.

Next, after completion of the scanning during the x-coordinate detection period T2, the sequence proceeds to the noise detection period T3. As will be described later, during the noise detection period T3, the coordinate detection circuit 7 detects the presence or absence of electrostatic interfering noise, judges the reliability of the coordinate detection signals, and carries out compensation and interpolation for the detected coordinates.

Here, the liquid crystal needs to be controlled in its molecule alignment by using ac voltage in order to prevent its degradation. Therefore, while the voltage of the opposing electrode 14 is kept constant, the level of the voltage of the column-electrode driving signal sa that has been released from the column-electrode driving circuit 3 is inverted for each constant cycle in response to the voltage of the opposing electrode 14. FIG. 6 shows an example wherein an inversion is made for each frame, and as shown in the bottom section of the drawing, the electric potential level of the pixel electrodes 12 corresponding to one row, which are connected to the single row electrode G through the TFTs 11, is inverted each time the scanning pulse is applied to the row electrode G so that the polarity to the electric potential of the opposing electrode 14 is inverted.

The following description will discuss specific structural examples of the respective circuits in the above-mentioned display-integrated type tablet device.

(1) Start-pulse-width expanding circuit

Figure 7:
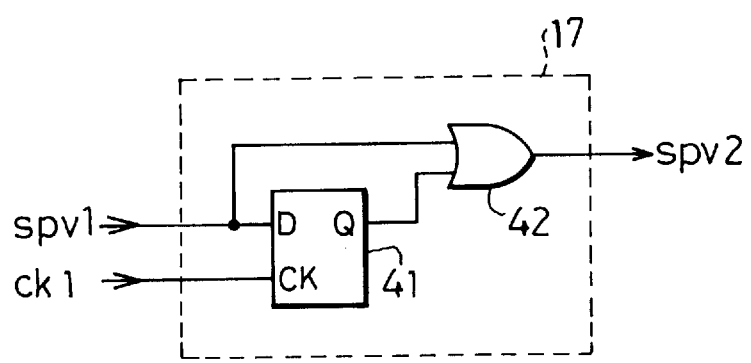
FIG. 7 is a circuit diagram showing a structural example of a start-pulse-width expanding circuit in the display-integrated type tablet device.

As described earlier, the start-pulse-width expanding circuit 17 adjusts the number of the row electrodes G to which the scanning pulses are simultaneously applied during the display period (Y-coordinate detection period) T1. As illustrated in FIG. 7, the start-pulse-width expanding circuit 17 is constituted of a flipflop 41 and an OR gate 42. The terminal D and the terminal CK of the flipflop 41 are connected to the display control circuit 4. Further, the terminal D of the flipflop 41 is connected to one of the input terminals of the OR gate 42 and the terminal Q is connected to the other input terminal of the OR gate 42. The output terminal of the OR gate 42 is connected to the row-electrode driving circuit 2.

Figure 8:
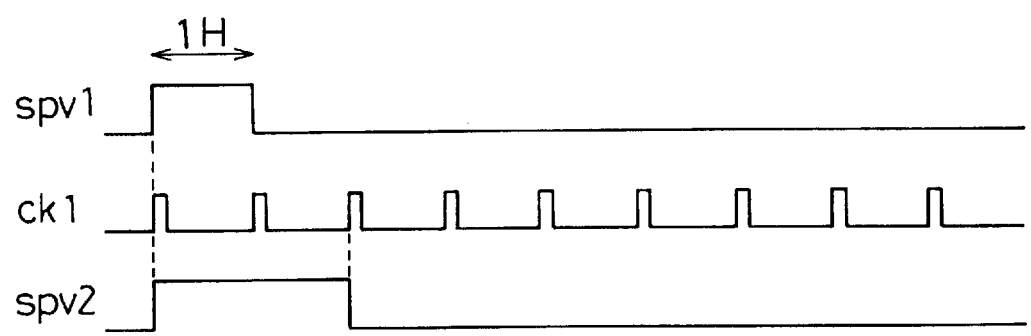
FIG. 8 is a timing chart showing operations of the start-pulse-width expanding circuit of FIG. 7.

As illustrated in FIG. 8, with this arrangement, a start pulse signal spv1, which is synchronous to the vertical sync signal V and has the same pulse width as the pulse width of the horizontal sync signal H, is supplied to the terminal D, and a clock signal ck1 (the first reference signal), which is synchronous to the horizontal sync signal H and has a predetermined pulse width, is supplied to the terminal CK from the display control circuit 4. In this case, since the start pulse signal spv1 corresponding to one cycle (1H) of the horizontal sync signal H, is inputted to the flipflop 41 simultaneously with the clock signal ck1, a signal that is delayed by one clock is released from the terminal Q of the flipflop 41. The signal from the terminal Q and the start pulse signal spv1 are composed in the OR gate 42, and the resulting signal is outputted as a shift-data signal spv2 (a display control signal). Thus, the shift data signal spv2 is supplied to the row-electrode driving circuit 2 as a pulse signal having a width corresponding to two clocks.

Figure 9:
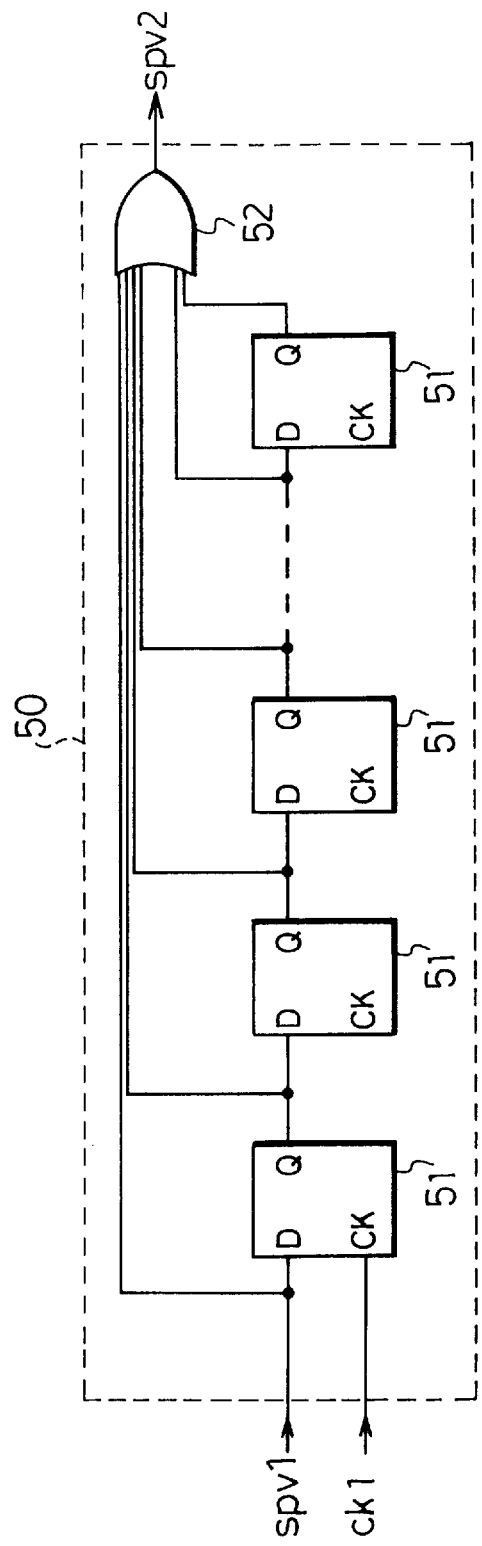
FIG. 9 is a circuit diagram showing another structural example of the start-pulse-width expanding circuit.
Figure 10:
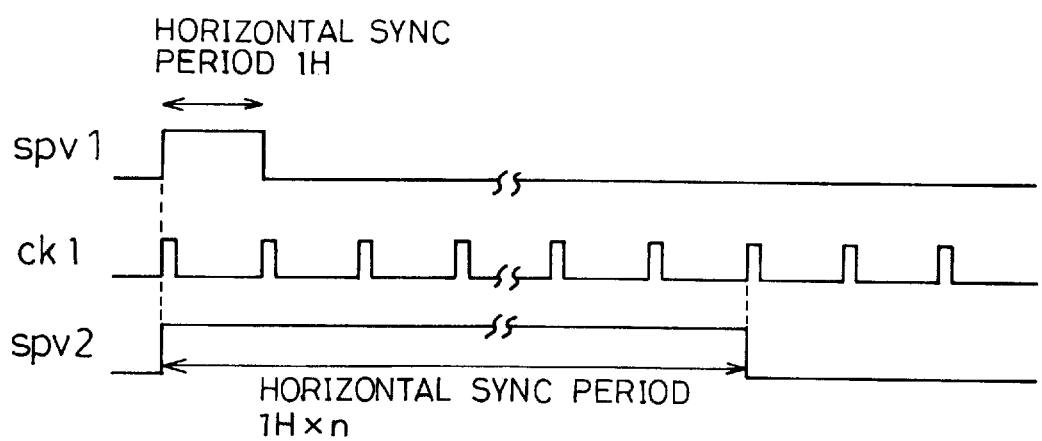
FIG. 10 is a timing chart showing operations of the start-pulse-width expanding circuit of FIG. 9.

Here, the above-mentioned start-pulse-width expanding circuit 17 is designed to expand the width of the start pulse by one clock; however, the present invention is not intended to be limited to this arrangement. In other words, as shown in FIG. 9, another start-pulse-width expanding circuit 50, which is constituted of an OR gate 52 and flipflops 51 the number of which is indicated by n−1, may be adopted. Here, the start pulse signal spv1 is inputted to the OR gate 52 after having passed through the n−1 number of flipflops 51, and also inputted to the OR gate 52, before it passes through each of the flipflops 51. In the OR gate 52, all signals that have inputted to the OR gate 52 are composed, and the resulting signal is released as the shift data signal spv2. Thus, as illustrated in FIG. 10, it becomes possible to expand the pulse width of the shift data signal spv2 to n times the clock width. In this case, since the display signal needs to be delayed by (n−1)×H, the above-mentioned delay circuit 18 also needs to be modified from a delay circuit of 1H to that of (n−1)×H.

(2) Row-electrode driving circuit

Figure 2:
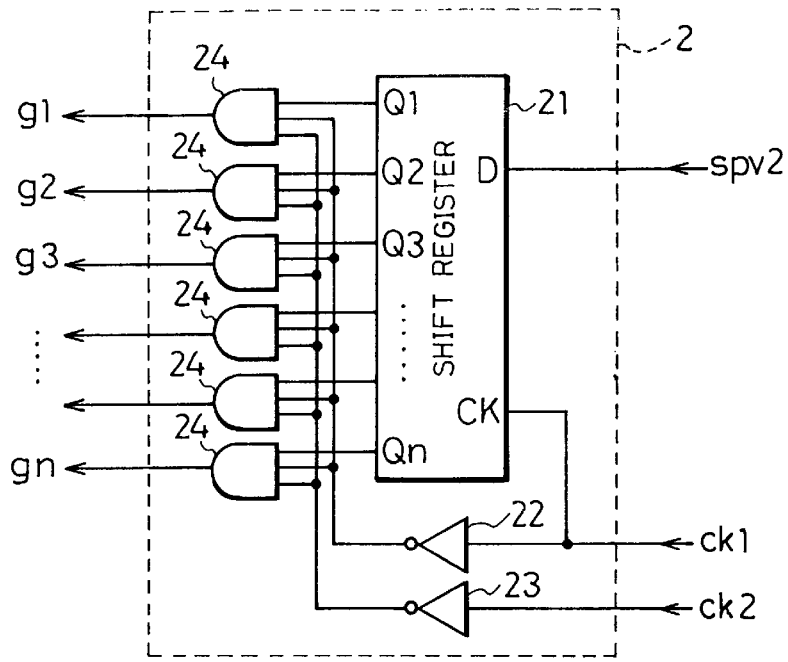
FIG. 2 is a circuit diagram showing one structural example of a row-electrode driving circuit in the display-integrated type tablet device.

As illustrated in FIG. 2, the row-electrode driving circuit 2 is constituted of a shift register 21 of n-stages (a sequential output section), inverters 22 and 23, and n-number of AND gates 24 (gate sections). The terminal D of the shift register 21 is connected to the output terminal of the OR gate 42 of the start-pulse-width expanding circuit 17, and the terminal CK is connected to the display control circuit 4. The terminals Q1 to Qn of the shift register 21 are connected to the respective input terminals of the AND gates 24. Further, the respective input terminals of the inverters 22 and 23 are connected to the display control circuit 4, and the respective output terminals are connected to two of the three input terminals of the AND gates 24. The output terminals of the AND gates 24 are connected to the aforementioned row electrodes G1 to Gn.

Figure 3:
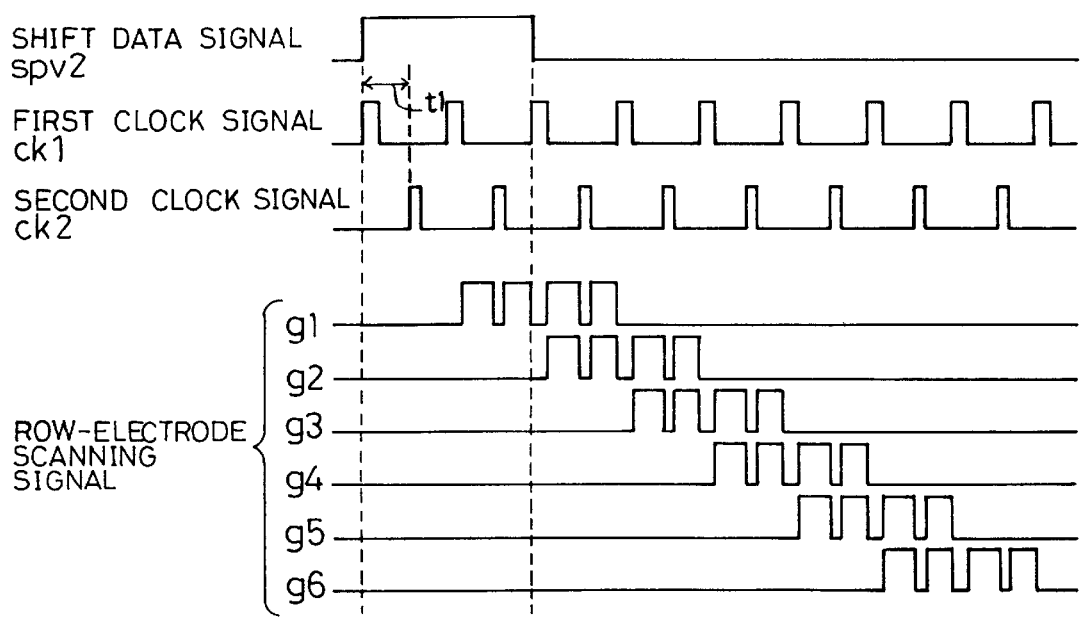
FIG. 3 is a timing chart showing operations of the row-electrode driving circuit.

As illustrated in FIG. 3, with the above-mentioned arrangement, the shift data signal spv2 is supplied to the terminal D of the shift register 21, and when the clock signal ck1 is supplied to the terminal CK, pulses of the shift data signal spv2 successively appear with delays one clock by one clock from the terminal Q1 toward the terminal Qn, and the respective pulses are supplied to the AND gates 24. Here, the clock signal ck1 is inputted to the inverter 22 and a clock signal ck2 (the second reference signal) is inputted to the inverter 23. The clock signal ck1 and the clock signal ck2, which have been inverted by the inverters 22 and 23 respectively, are inputted to the AND gates 24. Thus, the resulting signals from the AND gates 24 are row-electrode scanning signals g1 to gn, which are respectively synchronous to two cycles of the horizontal synchronous signal H and which are shifted one cycle by one cycle of the horizontal sync signal H from the row electrodes from G1 toward Gn. Each row-electrode scanning signal g is applied to the corresponding row electrode G so as to control the gate voltage of the TFTs 11. Here, the clock signal ck2, which is a signal that has the same cycle as the clock signal ck1 and that has different phase and pulse width therefrom, controls the timing when the row-electrode scanning signal g turns "off" instantaneously. Additionally, FIG. 3 shows waveforms of the row-electrode scanning signals g1 through g6.

(3) Delay circuit

Figure 33:
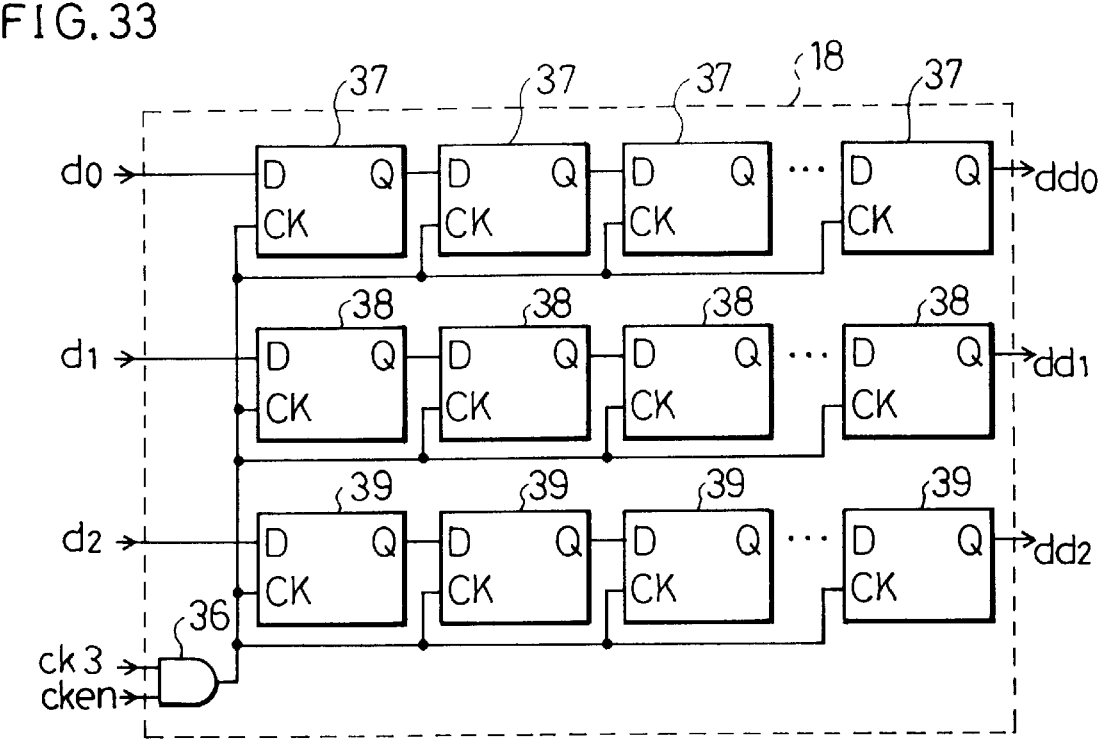
FIG. 33 is a circuit diagram showing a structural example of a delay circuit in the display-integrated type tablet device.

For example, in the case when the display signal d, which is released from the display control circuit 4 and inputted through the switching circuit 8, is three bits (display signals $d_0$, $d_1$, and $d_2$), the delay circuit 18 is arranged as shown in FIG. 33. In other words, the delay circuit 18 is constituted of an AND gate 36, n-number of flipflops 37, n-number of flipflops 38, and n-number of flipflops 39.

The terminal D of the first flipflop 37 is connected to the switching circuit 8, and the terminal Q of the n-numbered flipflop 37 is connected to the column-electrode driving circuit 3. Further, the n-number of flipflops 37 are respectively connected to each other through the terminals Q and the terminals D, and the respective terminals CK are connected to the output terminal of the AND gate 36. The n-number of flipflops 38 as well as the n-number of flipflops 39 are connected in the same manner as described above. Further, the two input terminals of the AND gate 36 are connected to the switching circuit 8.

Figure 34:
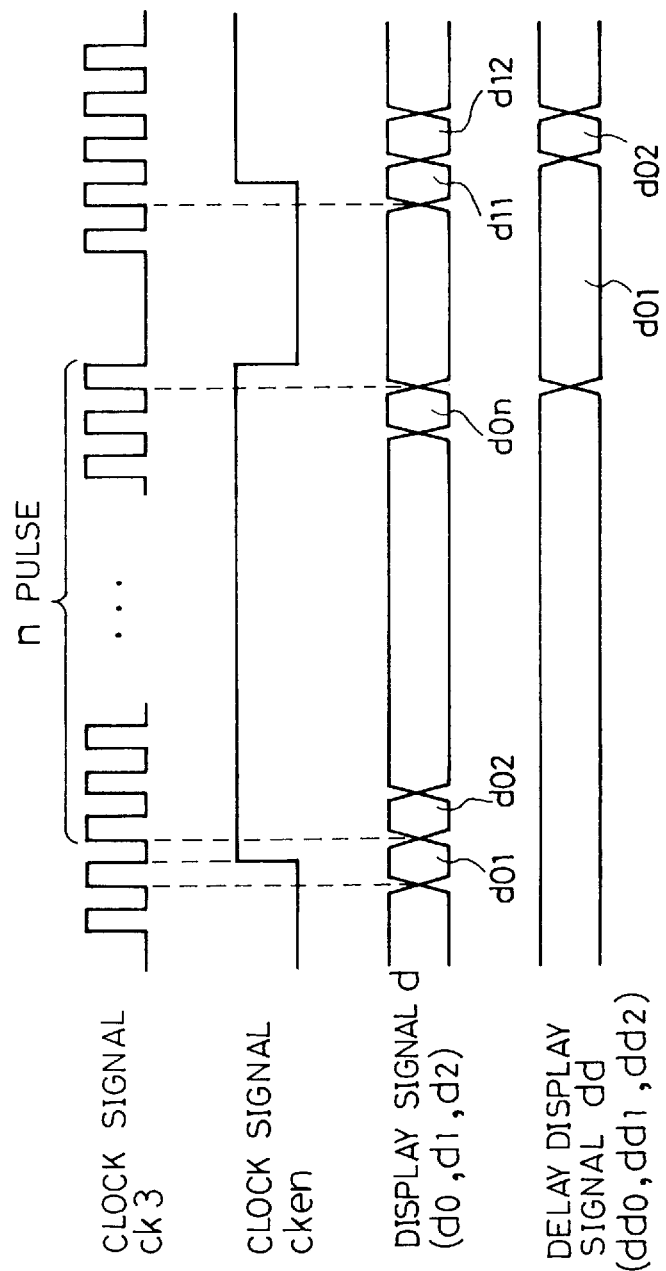
FIG. 34 is a timing chart showing operations of the delay circuit.

As illustrated in FIG. 34, with this arrangement, a clock signal ck3 and a clock signal cken, both generated by the display control circuit 4, are inputted to the AND gate 36. Then, while the clock signal cken is kept "High", n-number of pulses of the clock signal ck3 are inputted to the respective flipflops 37. Therefore, the display signal $d_0$, which has been inputted to the first flipflop 37, passes through the n-number of flipflops 37, and released from the n-numbered flipflop 37 as a delayed delay display signal $dd_0$. Similarly, the display signals $d_1$ and $d_2$ are also released through the respective flipflops 38 and 39 as delay display signals $dd_1$ and $dd_2$. In other words, the display signal d (display signals $d_0$, $d_1$, and $d_2$) are released as the delay display signals dd (delay display signals $dd_0$, $dd_1$, and $dd_2$).

Figure 35:
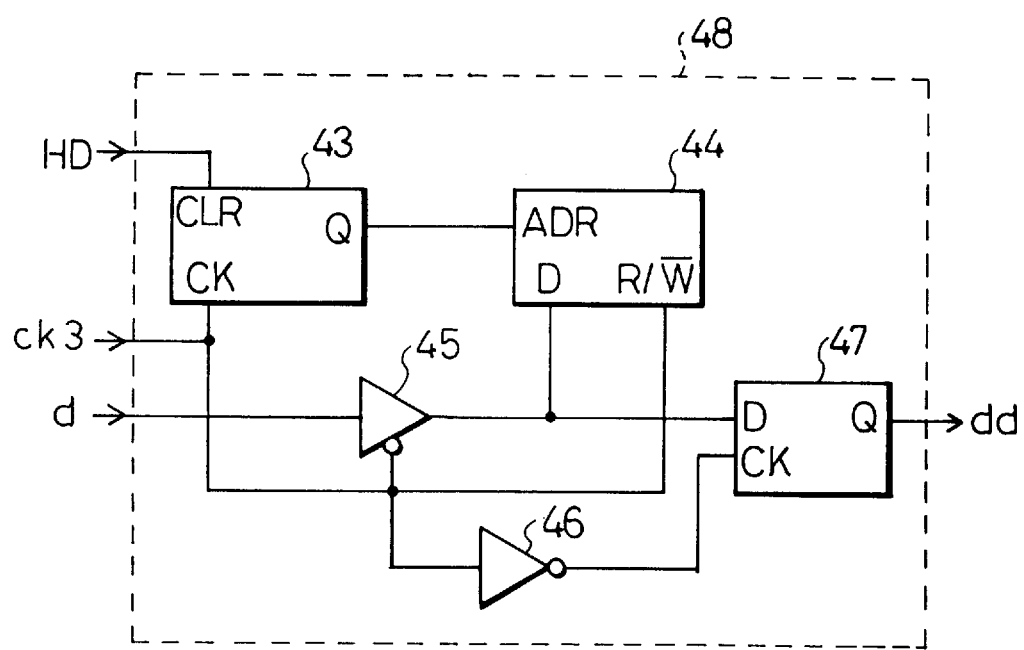
FIG. 35 is a circuit diagram showing another structural example of a delay circuit.

Additionally, the delay circuit 18 is not intended to be limited to this arrangement, and another delay circuit 48 using a memory 44, shown in FIG. 35, may be adopted. In this case, when the clock signal ck3 is kept "High", a 3-state buffer 45 blocks the transmission of the display signal d, and when it is kept "Low", the display signal d is transmitted so that data is written to the memory 44. In an UP counter 43, an address signal is released from the terminal Q, and in accordance with the address signal, the display signal d is read out, inputted to a flipflop 47, and released as the delay display signal dd. In this case, the inverted clock signal ck3 has been inputted to the flipflop 47 from an inverter 46.

Moreover, except for the above-mentioned methods, another method which delays the reading operation of data on the generating side of the display data d may be adopted, although not shown in the drawings.

(4) Column-electrode driving circuit

Figure 4:
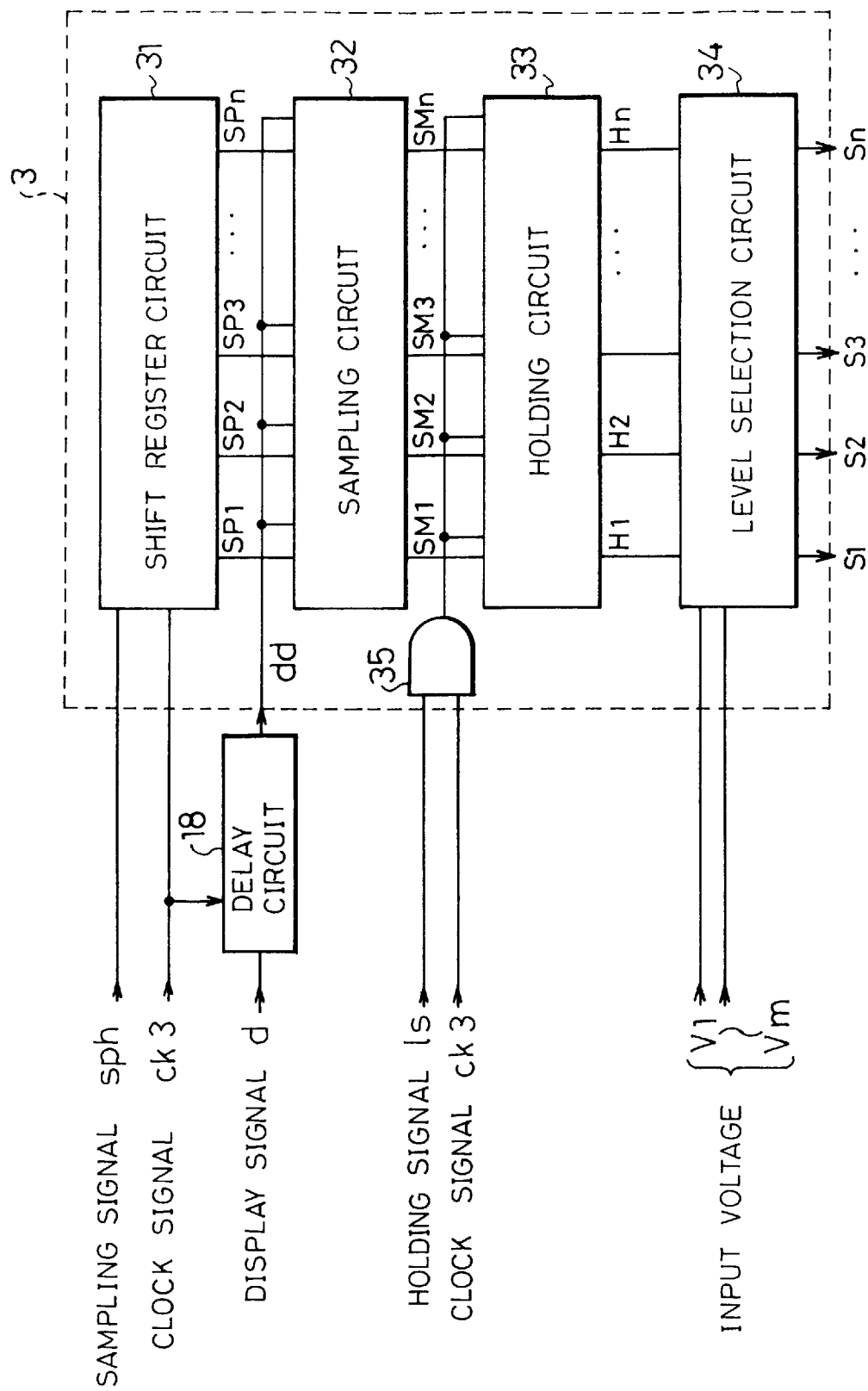
FIG. 4 is a circuit diagram showing one structural example of a column-electrode driving circuit in the display-integrated type tablet device.

As illustrated in FIG. 4, the column-electrode driving circuit 3 is constituted of a shift register 31, a sampling circuit 32, a holding circuit 33, a level selection circuit 34, and an AND gate 35. The input terminals of the shift register 31 and the AND gate 35 are respectively connected to the switching circuits 8. Further, the input terminal of the level selection circuit 34 is connected to the power supply circuit 16. The four circuits are connected to each other through n-number of input-output terminals, and the output terminal of the level selection circuit 34 is connected to the column electrodes S1 through Sn. Moreover, the input side of the sampling circuit 32 is connected to the delay circuit 18, and the input side of the holding circuit 33 is connected to the AND gate 35.

Figure 5:
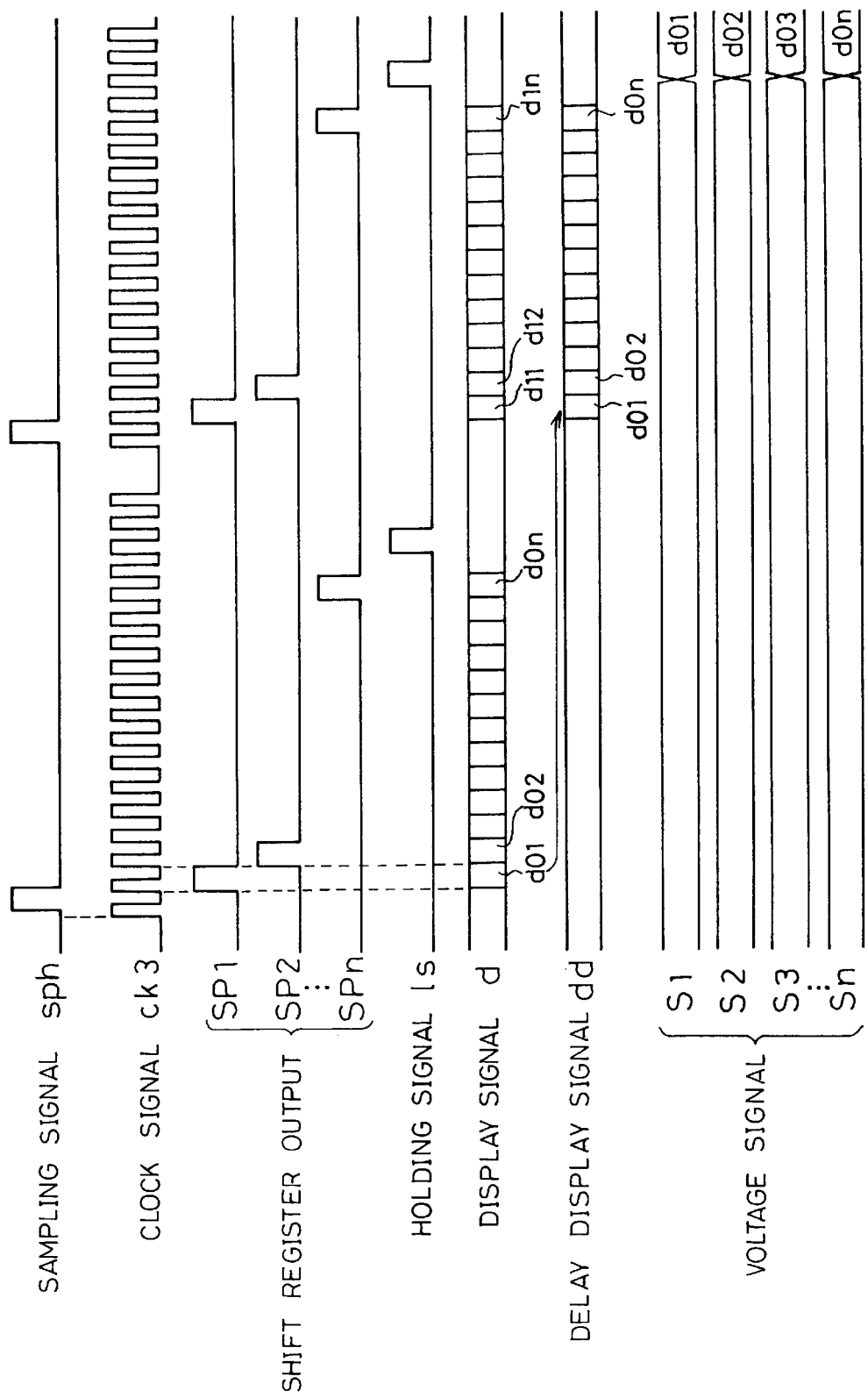
FIG. 5 is a timing chart showing operations of the column-electrode driving circuit.

Referring to a timing chart in FIG. 5 as well as to FIG. 4, the following description will discuss operations of the column-electrode driving circuit 3 during the display period (Y-coordinate detection period) T1 in accordance with the above-mentioned arrangement.

After a clock corresponding to 1H has been inputted thereto as described above, the delay circuit 18 forms the delay display signal dd, and supplies the signal to the sampling circuit 32.

The clock signal ck3, a sampling signal sph that is synchronous to the vertical sync signal V, and a holding signal ls having a phase different from the sampling signal sph, all of which are generated by the display control circuit 4, are supplied to the column-electrode driving circuit 3 through the switching circuit 8. In the column-electrode driving circuit 3, when the sampling signal sph and the clock signal ck3 are supplied to the shift register 31, the shift resister 31 successively releases outputs SP1 through SPn as pulse signals. When the outputs SP1 through SPn are inputted to the sampling circuit 32, the sampling circuit 32 successively stores the delay display signal dd in accordance with the timing of the outputs SP1 through SPn, thereby releasing outputs SM1 through SMn. After data corresponding one row of the delay display signal dd has been stored in the sampling circuit 32, the holding signal ls goes "High, and the holding circuit 33 takes the outputs SM1 through SMn at the same time, thereby releasing outputs H1 through Hn. When the outputs H1 through Hn are supplied to the level selection circuit 34, the level selection circuit 34 applies voltages V1 through Vm corresponding to the contents of the input data to the column electrodes S1 through Sn.

Referring to FIG. 11, the following description will discuss operations of the row-electrode driving circuit 2 and the column-electrode driving circuit 3 wherein display-driving voltages are applied to the row electrodes G and the column electrodes S so that the liquid crystal is driven.

As described earlier, when the start pulse signal spv1 that is synchronous with the vertical sync signal V is supplied and the clock signal ck1 that is synchronous with the horizontal sync signal H is also supplied, a row-electrode scanning signal g1 appears, for example, on the row electrode G1. Here, the voltages V1 through Vm, which correspond to display data that is delayed by one cycle of the horizontal sync signal H, are applied to the column electrode S1. Supposing that, for example, the voltage V2 is applied to the column electrode S1 during the first one cycle of the clock signal ck1, the TFT 11 turns "on" upon receipt of "High" of the row electrode G1, and the column electrode S1 becomes conductive to the pixel electrode 12 so that the voltage V2 is applied thereto. The pixel electrode 12 and the opposing electrode 14 form a capacitor with the liquid crystal located in between, and since the column electrode S1 and the column-electrode driving circuit 3 normally have impedances of several kΩ, the pixel electrode 12 is charged so as to infinitely approach the voltage V2 during "High" of the row electrode G1.

However, when the row electrode G1 goes "Low" as described earlier, the TFT 11 turns "off", and no current is allowed to flow through the capacitor formed by the pixel electrode 12 and the opposing electrode 14 so that the electric potential of the pixel electrode 12 is kept at an electric potential that had been attained immediately before the TFT 11 turned "off". In the case shown in FIG. 11, the time immediately before the TFT 11 last turned "off" coincides with the end of the second cycle of the clock signal ck1 in which the column electrode S1 has the voltage V3; therefore, the pixel electrode 12 is allowed to maintain the voltage V3 until the next access time of the row electrode G2. Even if the TFT 11 is turned "off" instantaneously during the first two cycles of the clock signal ck1, since a sufficient "on" time is provided, it is possible to insert a pulse used for pen-coordinates detection, without causing any adverse effects on the display. In addition, as indicated by the row-electrode scanning signal g shown in FIGS. 3 and 6, since the row electrodes G, always in their paired state, simultaneously go "Low" instantaneously, the first induced voltage exerted on the top of the electronic pen 6 becomes greater compared with that of a conventional arrangement.

(5) Construction of electronic pen

As illustrated in FIG. 12, the electronic pen 6 is constituted of a detection electrode 61 for detecting coordinates on the display panel 1 as signals and an amplifier 62 for amplifying the detected signals, both of which are housed in a pen-shaped container. The top portion of the detection electrode 61 is placed outside of the pen-shaped container and the rear portion is connected to the input terminal of the amplifier 62. The output terminal of the amplifier 62 is connected to the coordinate detection circuit 7. Here, the rear portion of the detection electrode 61 is connected to the pen-shaped container through an input capacitor 63 and an input resistor 64.

With this arrangement, during the Y-coordinate detection period T1, an electric potential variation is induced in the detection electrode 61 by the scanning pulse with an instantaneous Low level that has been applied to the row electrode G, due to the coupling capacity between the row electrode G and the detection electrode 61. The amplifier 62 amplifies the first induced voltage thus exerted, and releases the resulting voltage to the coordinate detection circuit 7. In the coordinate detection circuit 7, the Y-coordinate detection signal CY is obtained by synchronously detecting the first induced voltage that has been exerted by the scanning pulse with an instantaneous Low level that was applied to the row electrode G, which will be described later in detail.

Figure 13:
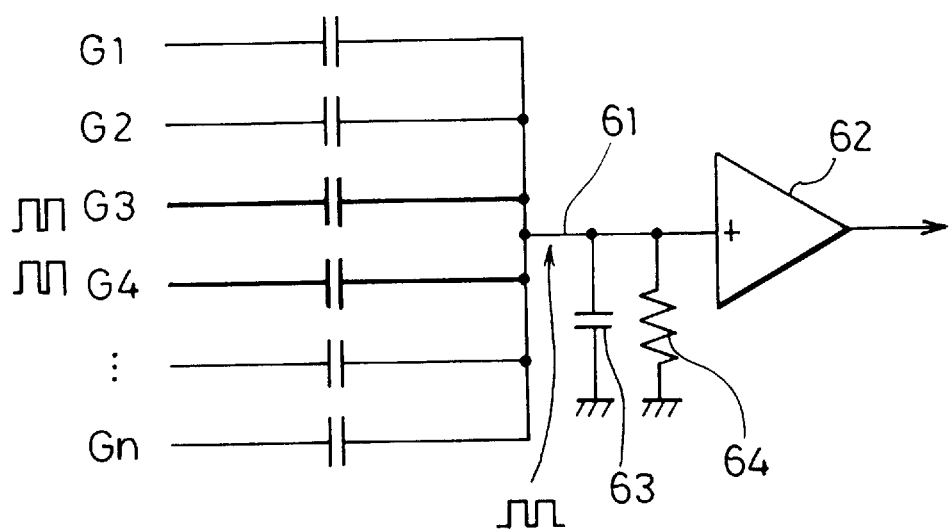
FIG. 13 is a circuit diagram showing an equivalent circuit of FIG. 12.

FIG. 12 shows how electrostatic coupling is made between the detection electrode 61 and arbitrary adjacent row electrodes Gk and Gk+1. With respect to the electrostatic coupling capacity, the greatest electrostatic coupling capacity is made between the detection electrode 61 and the row electrode G closest thereto. Therefore, when the detection electrode 61 comes closest to the row electrodes Gk and Gk+1, the greatest detection voltage is obtained instantaneously as the electric potential of the row electrodes Gk and Gk+1 varies. Here, FIG. 13 shows an equivalent circuit of FIG. 12. For example, supposing that k=3, the capacitances of capacitors (indicated by bold lines) that are formed by the row electrode G3 and the detection electrode 61 as well as by the row electrode G4 and the detection electrode 61 become greatest.

Figure 14:
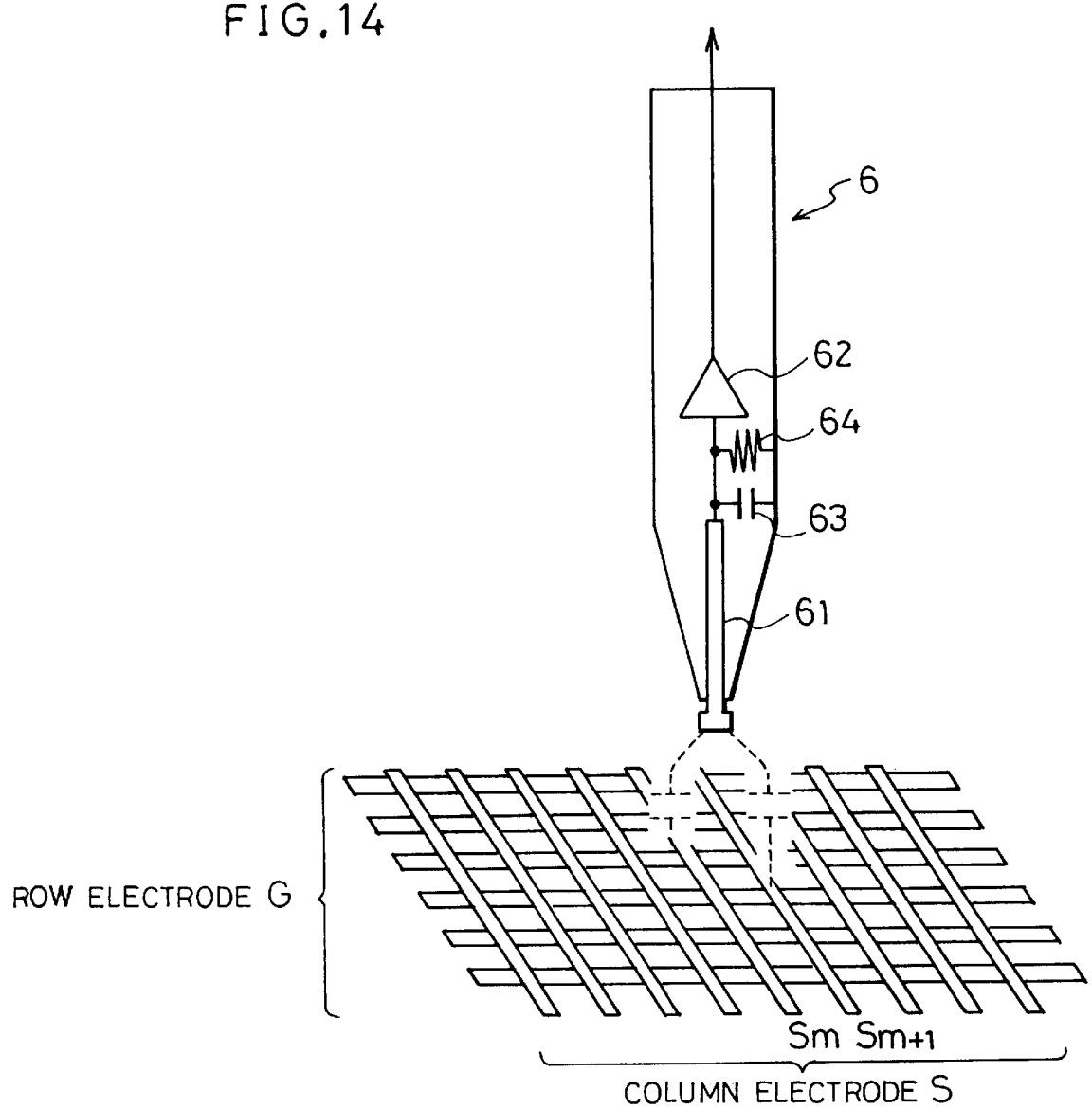
FIG. 14 is an explanatory drawing that shows a coupled state between the electronic pen and the display panel when column-electrodes are being scanned.
Figure 15:
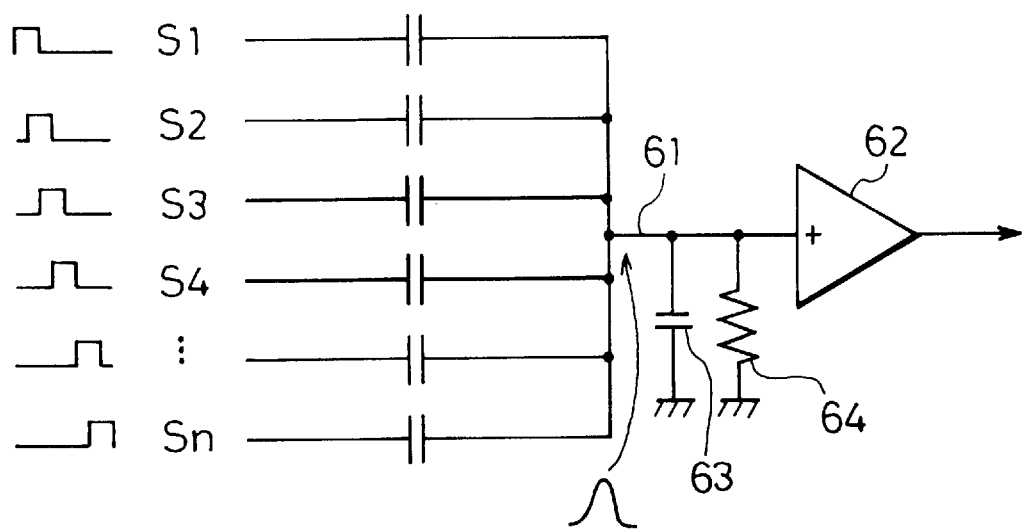
FIG. 15 is a circuit diagram showing an equivalent circuit of FIG. 14.

During the X-coordinate detection period T2, an electric potential variation of the column electrode S is induced in the detection electrode 61 by the column-electrode scanning signal sb shown in FIG. 6, due to the coupling capacity between the column electrode S and the detection electrode 61. In the same manner as described above, the amplifier 62 amplifies the third induced voltage thus exerted, and releases the resulting voltage to the coordinate detection circuit 7. Upon receipt of this, the coordinate detection circuit 7 provides the X-coordinate detection signal CX. FIG. 14 shows how electrostatic coupling is made between the detection electrode 61 and arbitrary adjacent column electrodes Sm and Sm+1, and FIG. 15 shows its equivalent circuit. FIG. 14 shows only electrostatic coupling with the column electrodes Sm and Sm+1; however, the detection electrode 61 always has electrostatic coupling with the column electrodes in the periphery thereof.

As described earlier, the liquid crystal needs to be controlled in its molecule alignment by using ac voltage in order to prevent its degradation. In the display-integrated type tablet device of the present embodiment, a modification is given to the application method of the ac voltage. In the normal case of TFT liquid crystal, an opposing electrode is kept at a constant voltage and a voltage to be applied onto the source side is made to have an inverted polarity for each frame, so that the average voltage to be applied to the liquid crystal of the respective pixels is set at 0 V in dc voltage. In the display-integrated type tablet device of the present embodiment, the polarity of the electric potential of the opposing voltage 14 is inverted upon receipt of each cycle of the horizontal sync signal H, and the inverted electric potential is induced in the detection electrode 61 of the electronic pen 6. Since the area of the opposing electrode 14 is sufficiently large, the voltage induced in the detection electrode 61 is sufficiently great, even compared with a Y-coordinate signal and an X-coordinate signal which will be described later.

Figure 16:
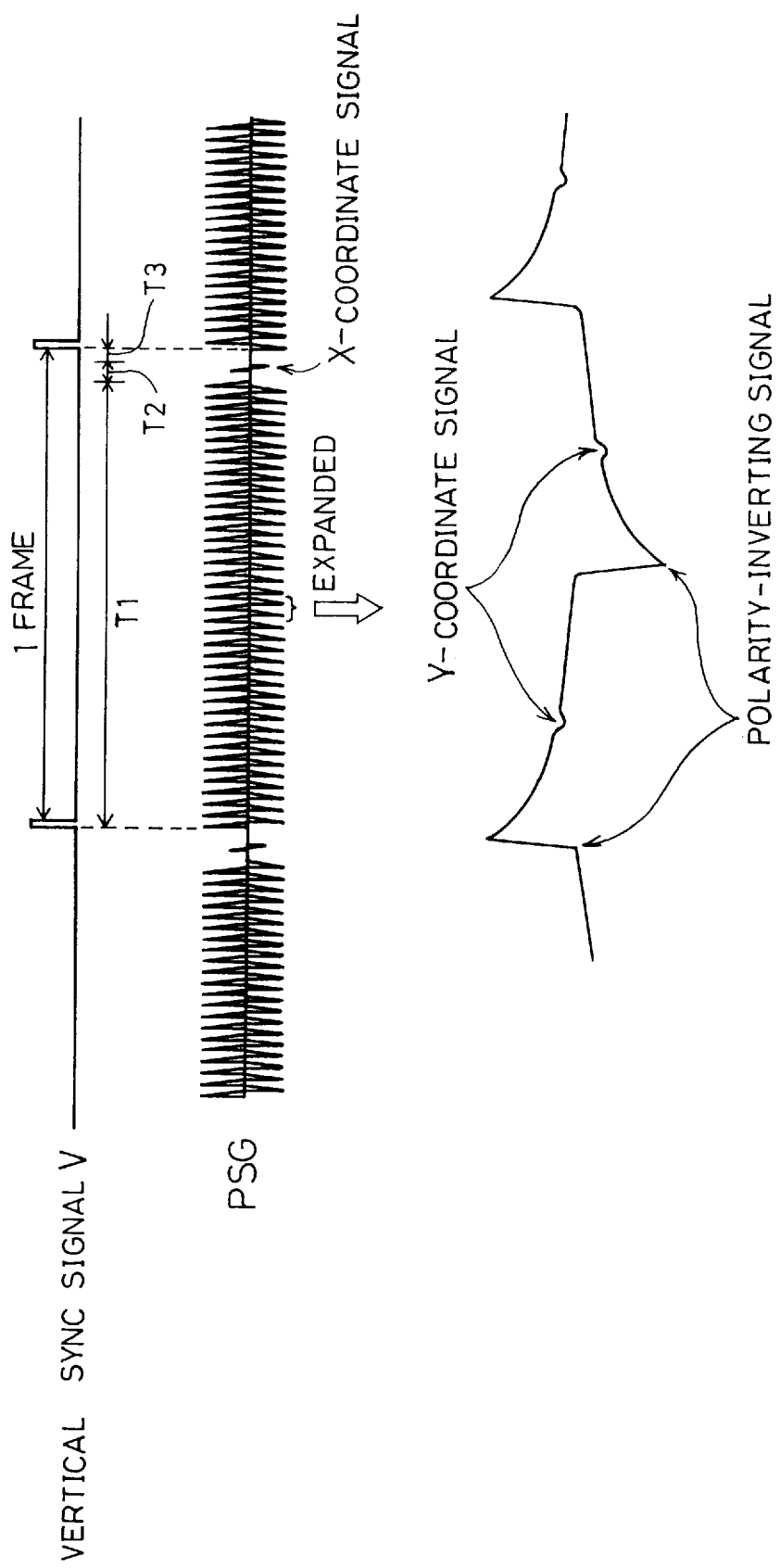
FIG. 16 is a waveform diagram that shows an output waveform of the electronic pen when row-electrodes are being scanned.

FIG. 16 shows a waveform of an electronic-pen output signal PSG that has been induced in the detection electrode 61 and amplified by the amplifier 62. As described earlier, when the vertical sync signal V is supplied to the display control circuit 4, the Y-coordinate detection period T1 first comes on, and the row-electrode driving circuit 2 releases pulses for use in display control as well as Y-coordinate detection so as to successively drive the row electrodes, starting from G1, as is shown in FIG. 6. At the same time, the polarity of the electric potential of the opposing electrode 14 is inverted in the same cycle as the horizontal sync signal H. Therefore, the electronic-pen output signal PSG, released from the electronic pen 6, has a polarity-inverting signal caused by the polarity inversion of the opposing electrode 14, as shown by an enlarged view of FIG. 16, and also has the Y-coordinate signal that exists in an embedded manner into the polarity-inverting signal. Further, upon receipt of the X-coordinate detection period T2, the opposing electrode driving circuit 15 stops the polarity-inverting operation, and the electronic-pen output signal PSG, which has the X-coordinate signal corresponding to the electric-potential variation of the column electrode S, is obtained. The electronic-pen output signal PSG, thus obtained, is supplied to the coordinate detection circuit 7.

(6) Coordinate detection circuit

The coordinate detection circuit 7 is constituted of a Y-coordinate-signal detection circuit (first positional-information detection means), a panel-proximity-signal detection circuit, an X-coordinate-signal detection circuit (second positional-information detection means) and a noise-signal detection circuit (interfering-noise detection means).

Figure 17:
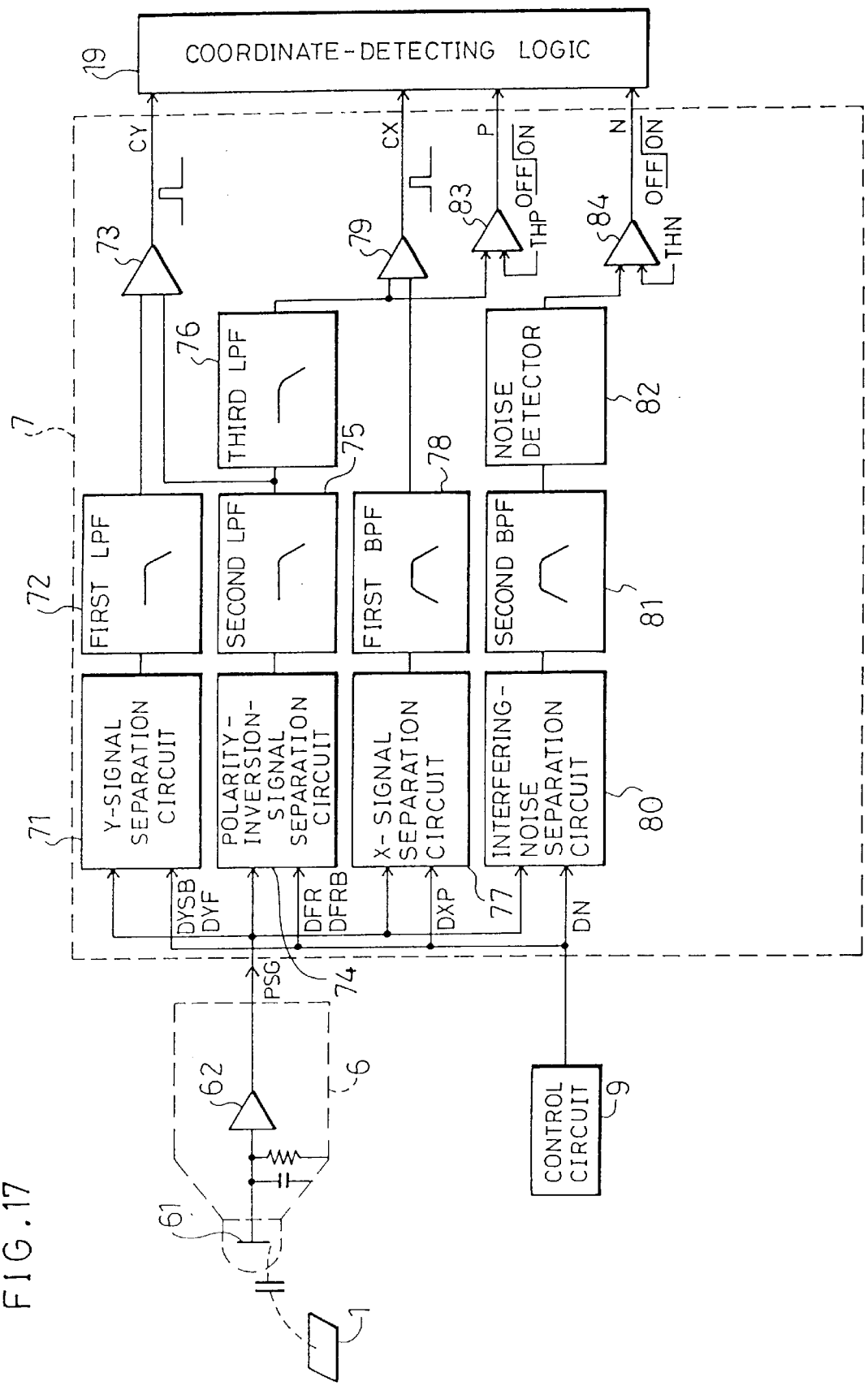
FIG. 17 is a block diagram showing a construction of a coordinate detection circuit in the display-integrated type tablet device.

The Y-coordinate-signal detection circuit is a circuit for detecting only the Y-coordinate signal contained in the electronic-pen output signal PSG in a pulsed form during the display period (Y-coordinate detection period) T1, and is provided with a Y-signal separation circuit 71, a polarity-inversion-signal separation circuit 74, the first and second LPFs (low-pass filters) 72 and 75, and the first CMP (a comparator) 73, as illustrated in FIG. 17.

Moreover, the panel-proximity-signal detection circuit is a circuit for detecting the fact that the electronic pen 6 comes close to the display panel 1, and is provided with the polarity-inversion-signal separation circuit 74, the second and third LPFs 75 and 76, and the third CMP 83.

The X-coordinate-signal detection circuit is a circuit for detecting only the X-coordinate signal contained in the electronic-pen output signal PSG in a pulsed form during the X-coordinate detection period T2, and is provided with the polarity-inversion-signal separation circuit 74, the second and third LPFs 75 and 76, an X-signal separation circuit 77, the first BPF (a band-pass filter) 78, and the second CMP 79.

The noise-signal detection circuit is a circuit for detecting interfering noise externally merged, during the noise detection period T3, and is provided with an interfering-noise separation circuit 80, the second BPF 81, a noise detector 82, and the fourth CMP 84.

Figure 18:
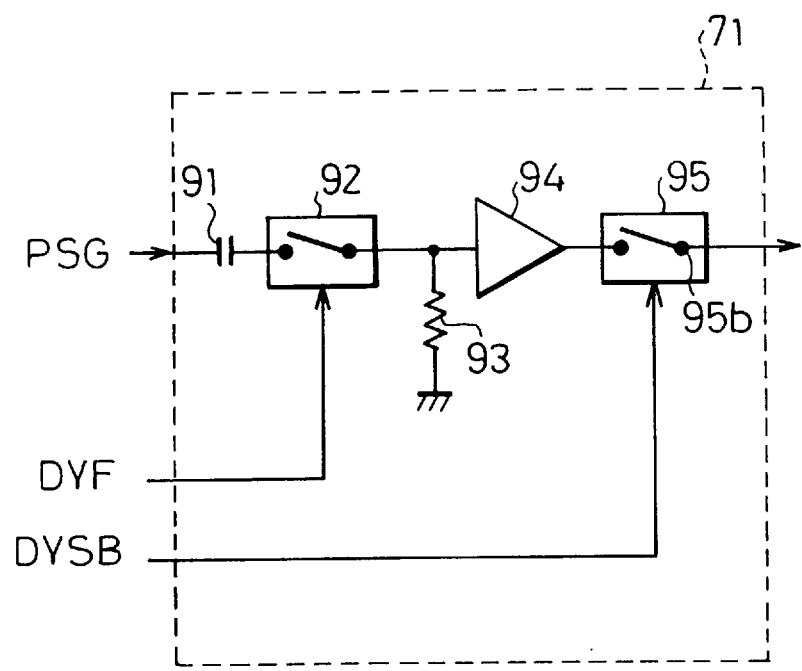
FIG. 18 is a circuit diagram showing a structural example of a Y-signal separation circuit in the coordinate detection circuit.
Figure 19:
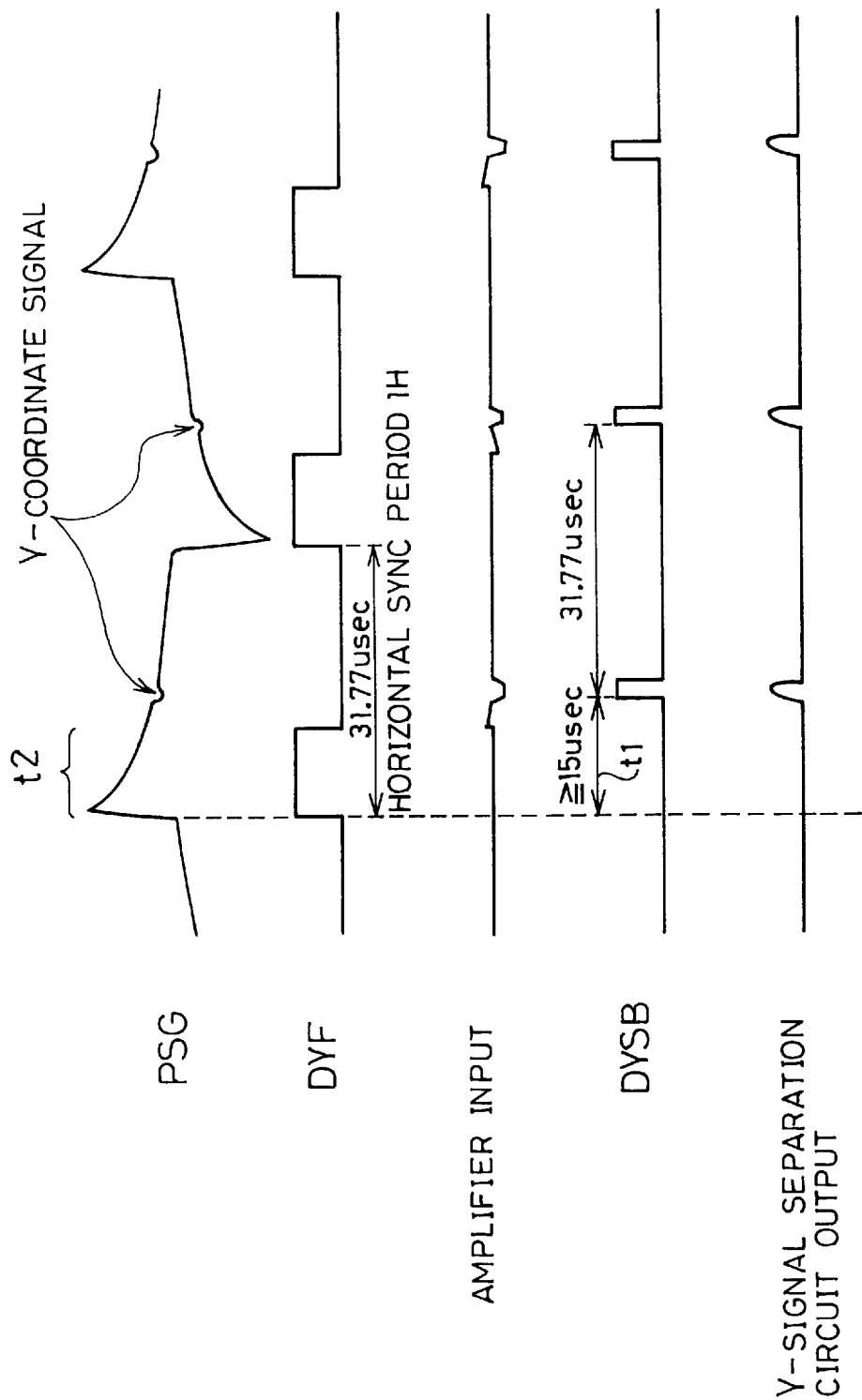
FIG. 19 is a timing chart showing operations of the Y-signal separation circuit.

(6-1) Y-coordinate-signal detection circuit FIG. 18 shows a specific circuit diagram of the Y-signal separation circuit 71 in the Y-coordinate-signal detection circuit. The Y-signal separation circuit 71 is a circuit for allowing signals to pass only during the display period (Y-coordinate detection period) T1 from the inputted electronic-pen output signal PSG. The Y-signal separation circuit 71 is constituted of a capacitor 91, analog switches 92 and 95, a resistor 93, and an amplifier 94. The output terminal of the amplifier 62 of the electronic pen 6 is connected to the input terminal of the analog switch 92 through the capacitor 91. The output terminal of the analog switch 92 is connected to ground through the resistor 93, and is also connected to the input terminal of the amplifier 94. The input terminal of the analog switch 95 is connected to the output terminal of the amplifier 94, and the output terminal 95b is connected to the first LPF 72. Further, the control circuit 9 is connected to the input terminals of the analog switches 92 and 95.

With this arrangement, a separation-controlling signal DYSB and a controlling signal DYF from the control circuit 9, as well as the electronic-pen output signal PSG from the electronic pen 6, are supplied to the Y-signal separation circuit 71. As shown in the second stage of FIG. 19, the controlling signal DYF, which is synchronous with the horizontal sync signal H, is a signal that goes "High" for a while after the electric potential of the opposing electrode 14 was inverted, that is, after the polarity-inverting signal was inverted. When the controlling signal DYF becomes "High", the analog switch 92 turns "off", thereby blocking the transmission of the electronic-pen output signal PSG.

When, in the electronic-pen output signal PSG, a signal derived from the polarity inversion of the opposing electrode 14 approaches 0 V, the controlling signal DYF goes "Low", thereby allowing the analog switch 92 to pass a minute Y-coordinate signal. The Y-coordinate signal that has been transmitted is inverted in the amplifier 94, and released to the analog switch 95. At this time, as illustrated in the fourth stage of FIG. 19, the separation-controlling signal DYSB, which has been fed to the analog switch 95, goes "High" in synchronism with the timing when the aforementioned row-electrode scanning signal g to be applied to the row electrode G becomes "Low" instantaneously. Here, since the analog switch 95 is kept "on" during the "High" of the separation-controlling signal DYSB, the analog switch 95 can effectively extract only the Y-coordinate signal, and release it from the output terminal 95b (see the last stage of FIG. 19).

Figure 37:
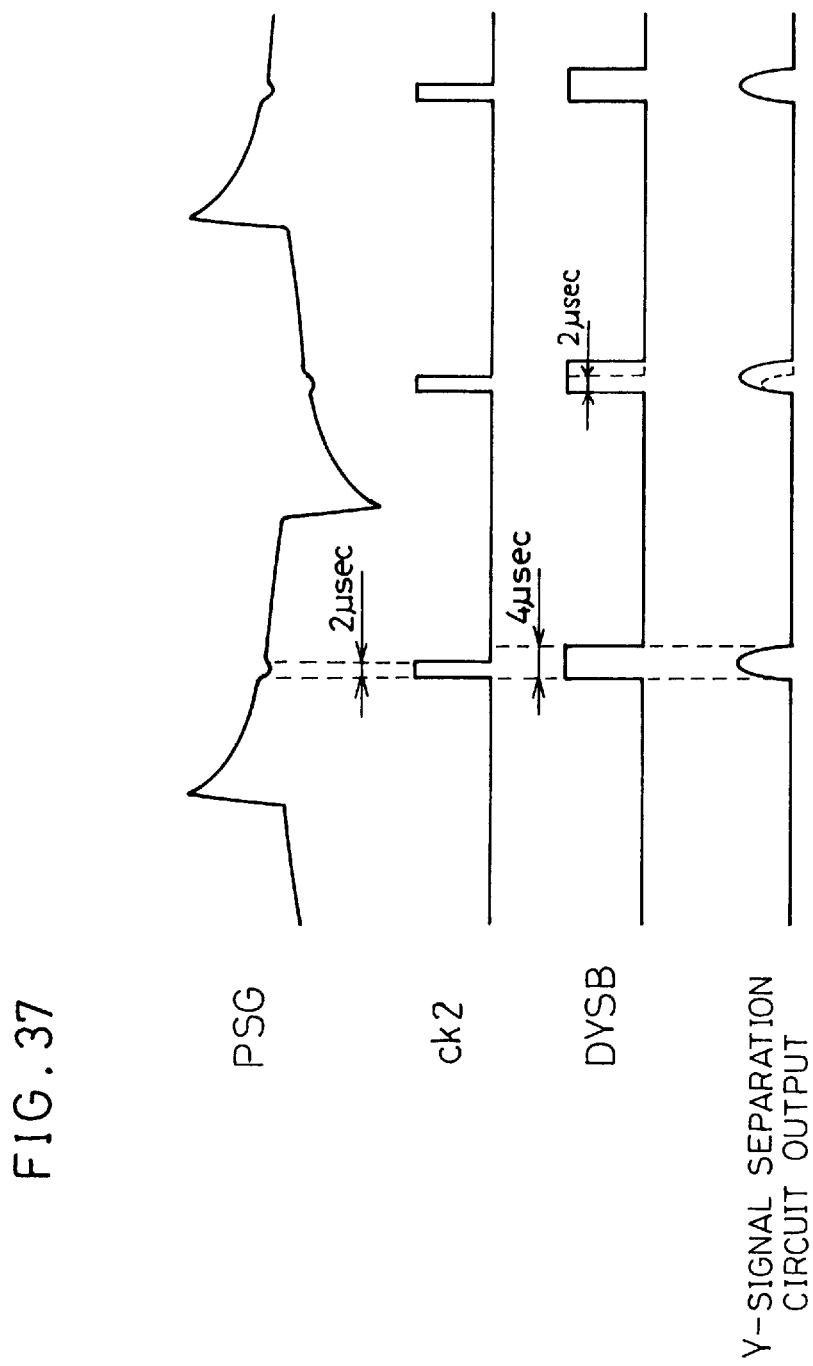
FIG. 37 is a timing chart that shows the relationship between the pulse width of a separation-controlling signal and the output of the Y-signal separation circuit.

Here, when the pulse width of the separation-controlling signal DYSB is made wider than the period in which the row-electrode scanning signal g is "Low" state instantaneously, it becomes possible to effectively use both of the energies of the electric potentials of the row electrode G in its rising and falling states. For example, as illustrated in FIG. 37, supposing that the period in which the row-electrode scanning signal g is "Low" state instantaneously is set to 2 μsec, the pulse width of the separation-controlling signal DYSB is preferably set to 4 μsec. If the pulse width of the separation-controlling signal DYSB is set to 2 μsec in the same manner as the period in which the row-electrode scanning signal g is "Low" state instantaneously, the output of the Y-signal separation circuit 71 fails to use the energy of the electric potential of the row electrode G in its rising state, and becomes small as is indicated by broken lines in the centers of waveforms in the second and third stages of FIG. 37.

Moreover, it is preferable to make the timing when the row-electrode scanning signal g instantaneously goes "Low" apart from the timing of the polarity inversion as far as possible. In other words, the phase-difference time t1 (see FIGS. 3 and 19) between the clock signal ck1 and the clock signal ck2 is made longer than the transitional response time t2 of the great second induced voltage that is caused by the polarity inversion. This makes it possible to reduce influences of the second induced voltage, thereby providing a Y-coordinate signal having a good S/N ratio. If the phase-difference time t1 is small, the Y-coordinate signal is embedded into the transitional response time t2 of the second induced voltage, resulting in adverse effects of polarity inversion on the output of the Y-signal separation circuit 71.

It has been discovered through experiments that supposing one cycle (1H) of the horizontal sync signal H is set at 31.77 μsec, an excellent Y-coordinate signal is obtained when the phase-difference time t1, that is, the time from the timing of polarity inversion until the timing when the row-electrode scanning signal g instantaneously goes "Low", is set not less than 15 μsec.

Figure 20:
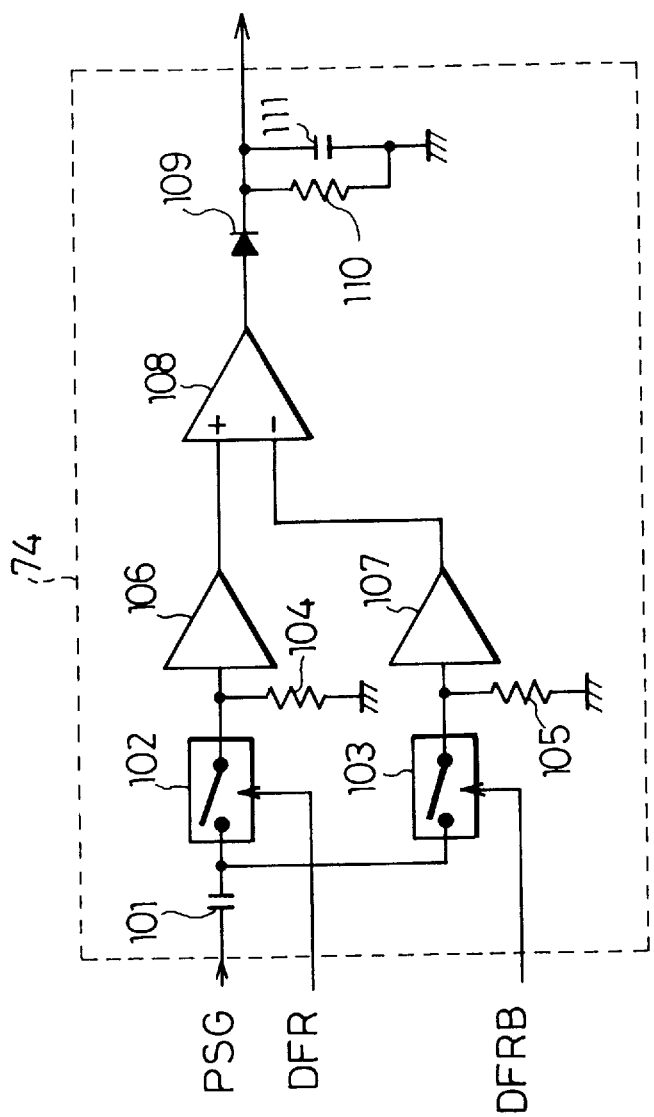
FIG. 20 is a circuit diagram showing a structural example of a polarity-inversion-signal separation circuit in the coordinate detection circuit.

FIG. 20 shows a specific circuit diagram of the polarity-inversion-signal separation circuit 74. The polarity-inversion-signal separation circuit 74 detects the magnitude of a polarity-inversion signal of the opposing electrode 14 that has appeared in the electronic-pen output signal PSG. The polarity-inversion-signal separation circuit 74 is provided with a capacitor 101, analog switches 102 and 103, resistors 104 and 105, amplifiers 106, 107 and 108, a detection diode 109, a discharge resistor 110, and a capacitor 111 for holding detection voltage.

The input terminals of the analog switches 102 and 103 are respectively connected to the amplifier 62 of the electronic pen 6 through the capacitor 101. The output terminal of the analog switch 102 is connected to ground through the resistor 104, and is also connected to the positive input terminal of the amplifier 108 through the amplifier 106. The output terminal of the analog switch 103 is connected to ground through the resistor 105, and is also connected to the negative input terminal of the amplifier 108 through the amplifier 107. The output terminal of the amplifier 108 is connected to the second LPF 75 through the detection diode 109. Here, the discharge resistor 110 and the capacitor 111 for holding detection voltage are connected in parallel with each other. Further, the input terminals of the analog switches 102 and 103 are respectively connected to the control circuit 9.

Figure 21:
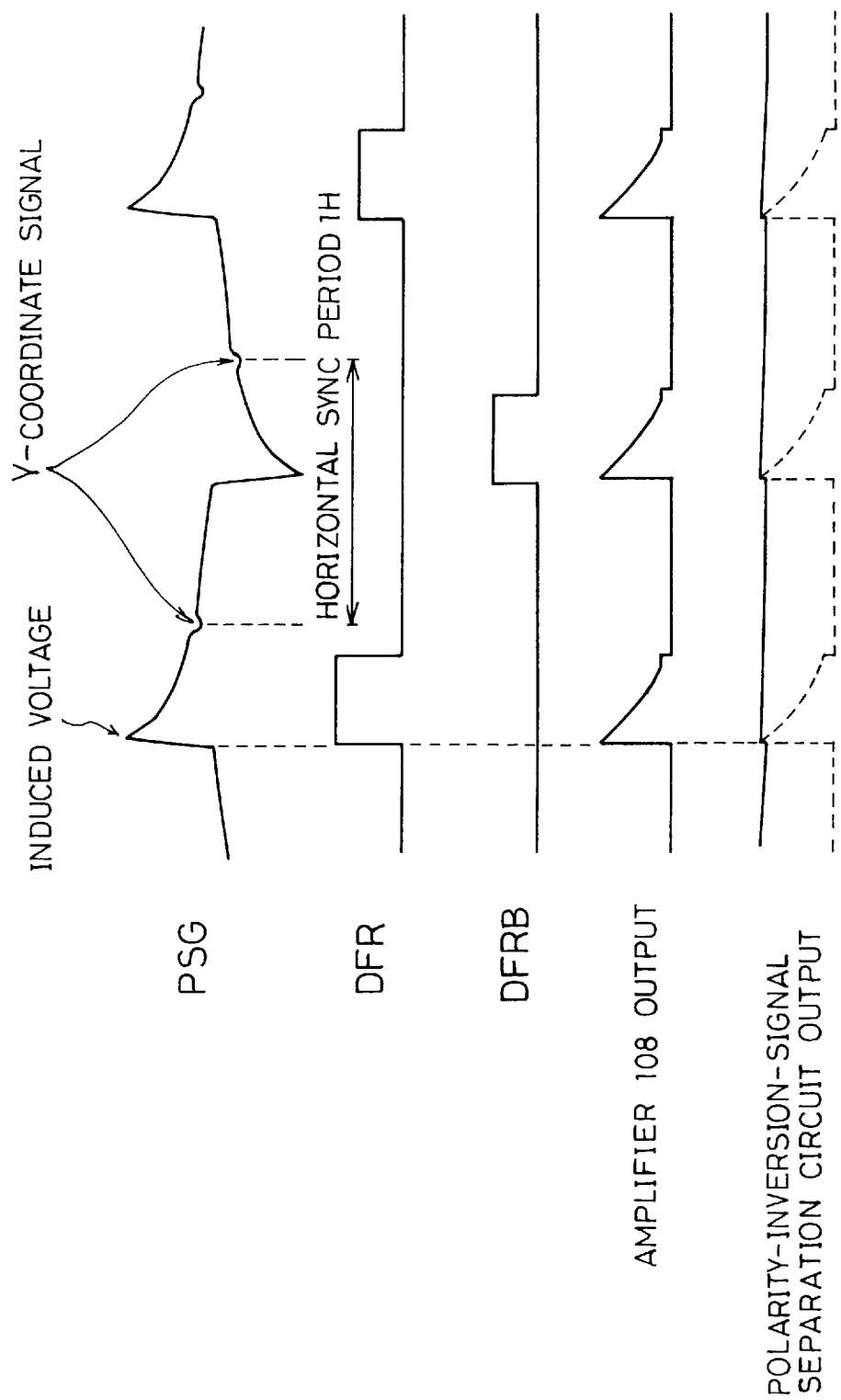
FIG. 21 is a timing chart showing operations of the polarity-inversion-signal separation circuit.

Referring to the timing chart of FIG. 21, the following description will discuss operations of the polarity-inversion-signal separation circuit 74 having the above-mentioned arrangement. A controlling signal DFRB and a controlling signal DFR from the control circuit 9, as well as the electronic-pen output signal PSG, are supplied to the polarity-inversion-signal separation circuit 74. When the polarity of the voltage that is applied to the opposing electrode 14 is inverted, the second induced voltage (polarity-inversion signal), which is a great voltage increasing from 0 V toward the positive electric potential direction, is exerted in the electronic-pen output signal PSG. The controlling signal DFR, which is a controlling signal that is synchronous with two cycles (2H) of the horizontal sync signal H, changes from "Low" to "High" instantaneously as the polarity-inversion signal increases from 0 V toward the positive electric potential direction. During the controlling signal DFR is held "High", the analog switch 102 is "on", and the electronic-pen output signal PSG is supplied to the amplifier 106. The electronic-pen output signal PSG is buffered by the amplifier 106 so that it further supplies a signal to the amplifier 108. Thereafter, when the electric potential of the electronic-pen output signal PSG comes close to 0 V, the controlling signal DFR goes "Low". During the controlling signal DFR is held "Low", the analog switch 102 is "off", and the transmission of the electronic-pen output signal PSG is blocked. Thus, the positive polarity-inversion signal, contained in the electronic-pen output signal PSG, is extracted.

The controlling signal DFRB is, on the other hand, a signal that goes "High" instantaneously as the polarity-inversion signal, which increases from 0 V toward the negative electric potential direction, appears in the electronic-pen output signal PSG, and this signal is synchronous with 2H in the same manner as the controlling signal DFR. During the controlling signal DFRB is held "High", the analog switch 103 is "on", and the negative polarity-inversion signal is buffered by the amplifier 107, and supplied to the amplifier 108.

The above-mentioned positive and negative polarity-inversion signals are composed in the amplifier 108. Then, the detection circuit, which is constituted of the detection diode 109, the discharge resistor 110, and the capacitor 111 for holding detection voltage, outputs a polarity-inversion signal that holds a peak value of the composite waveform as shown in the fifth stage of FIG. 21 and the third stage of FIG. 23.

Figure 22:
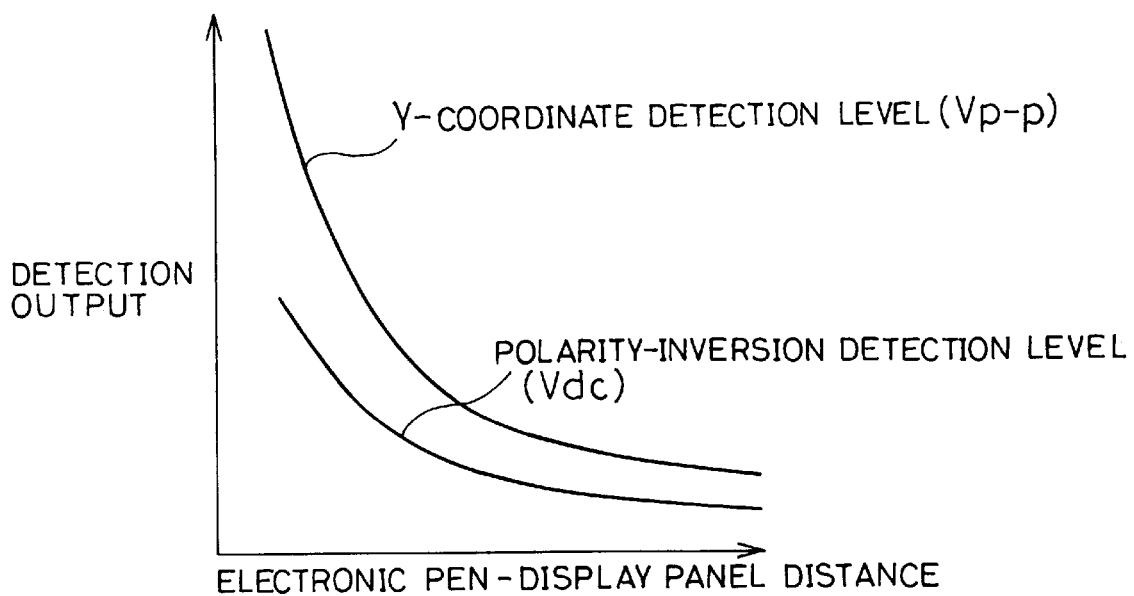
FIG. 22 is a graph showing the Y-coordinate-detecting characteristics and the polarity-inversion detecting characteristics.

FIG. 22 shows output characteristics of the polarity-inversion-signal separation circuit 74 and the Y-signal separation circuit 71. This indicates that the detection level of polarity inversion decreases as the distance between the electronic pen 6 and the display panel 1 increases. The reason is that, since the detection electrode 61 of the electronic pen 6 is electrostatically coupled with the opposing electrode 14, the coupling capacity becomes smaller as the electronic pen 6 departs from the display panel 1 so that the signal level detected by the polarity-inversion-signal separation circuit 74 also becomes smaller. In contrast, when the electronic pen 6 approaches the display panel 1, the signal level to be detected increases. Further, it is confirmed that the detection level of Y-coordinate reduces as the distance between the electronic pen 6 and the display panel 1 increases. The reason is that the Y-coordinate signal, which is inputted to the first CMP 73, is dependent on the electrostatic coupling capacity due to the detection electrode 61 of the electronic pen 6 and the row electrode G.

As clearly shown by FIG. 22, with respect to the distance between the detection electrode 61 of the electronic pen 6 and the display panel 1, the ratio of detection level of the Y-coordinate signal and the polarity-inversion signal is always held at a constant value. Therefore, it is possible to obtain a stable Y-coordinate detection signal CY independent of the distance.

Figure 23:
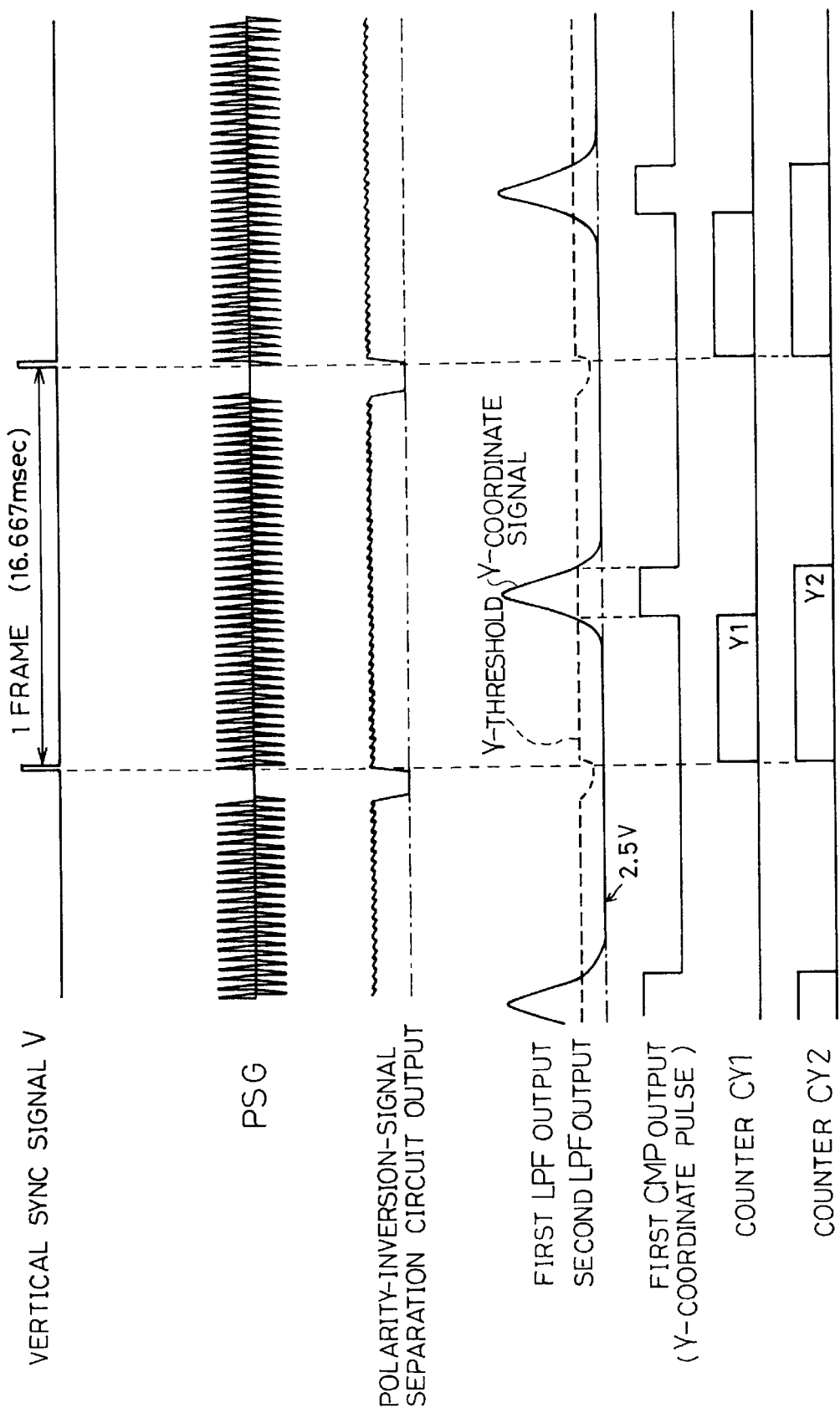
FIG. 23 is a timing chart showing Y-coordinate-detecting operations by the Y-coordinate-signal detection circuit and the coordinate-detection logic.

Referring to a timing chart in FIG. 23 and FIG. 17, the following description will discuss operations of the above-mentioned Y-coordinate-signal detection circuit.

As described earlier, the Y-coordinate signal is embedded into the polarity-inversion signal in the electronic-pen output signal PSG from the electronic pen 6. When the electronic-pen output signal PSG is inputted to the Y-signal separation circuit 71, only the Y-coordinate signal is synchronously detected, as described earlier. The Y-coordinate signal, released from the Y-signal separation circuit 71, is smoothed by eliminating its high frequency components in the first LPF 72, and outputted with a waveform that is indicated by a solid line shown in the fourth stage in FIG. 23, and the resulting signal is inputted to one of the input terminals of the first CMP 73.

Here, the electronic-pen output signal PSG is also inputted to the polarity-inversion-signal separation circuit 74. The polarity-inversion signal, which has been detected by the polarity-inversion-signal separation circuit 74, have its high frequency components eliminated by the second LPF 75 to have a waveform indicated by a broken line shown in the fourth stage of FIG. 23, and the resulting signal is inputted to the other input terminal of the first CMP 73 as a threshold value voltage. The output of the first LPF 72 and the output of the second LPF 75 are compared in their waveforms by the first CMP 73, and formed as a pulsed signal having a waveform shown in the fifth stage of FIG. 23 so as to be detected as a Y-coordinate detection signal CY. The Y-coordinate detection signal CY is inputted to the coordinate-detecting logic 19.

The coordinate-detecting logic 19 has a counter CY1 and a counter CY2. The detected Y-coordinate detection signal CY is counted in terms of time up to the rise of the pulse by the counter CY1, and also counted in terms of time up to the fall of the pulse by the counter CY2, with the vertical sync signal V being used as a reset signal. Thus, the Y-coordinate value is obtained as a counted value. In other words, supposing that the coordinate value obtained by the counter CY1 is Y1 and that the coordinate value obtained by the counter CY2 is Y2, the true coordinate value Y is represented by:

$$Y=(Y1+Y2)/2 \tag{1}$$

(6-2) Panel-proximity-signal detection circuit

Referring to FIG. 17, the following description will discuss operations of the panel-proximity-signal detection circuit. As described above, after having passed through the polarity-inversion-signal separation circuit 74 and the second LPF 75, the electronic-pen output signal PSG is inputted to the third LPF 76 as a polarity-inversion signal. The third LPF 76 suppresses the high frequency components of the polarity-inversion signal, and inputs the resulting signal to one of the input terminals of the third CMP 83. At this time, a threshold value voltage THP has been supplied to the other input terminal of the third CMP 83; therefore, when the electronic pen 6 approaches the display panel 1, the output of the polarity-inversion signal exceeds the threshold value voltage THP so that the output of the third CMP 83 goes "High". Consequently, the output of the third CMP 83 is outputted to the coordinate-detecting logic 19 as a panel-proximity detection signal P which indicates that the electronic pen 6 is in the proximity of the display panel 1.

(6-3) X-coordinate-signal detection circuit

Figure 27:
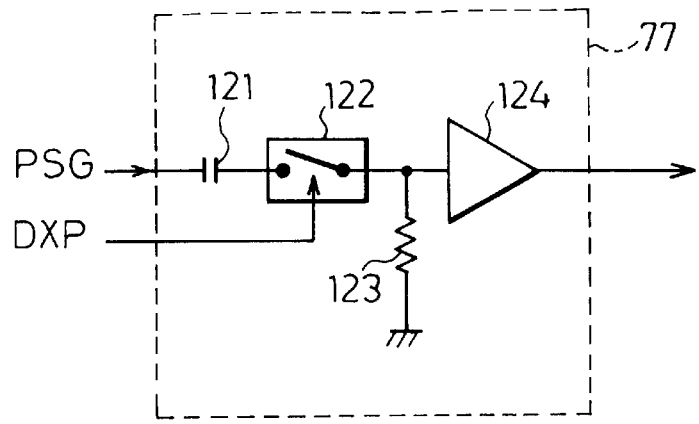
FIG. 27 is a circuit diagram showing a structural example of a X-signal separation circuit in the coordinate detection circuit.

FIG. 27 shows a specific circuit diagram of the X-signal separation circuit 77 in the X-coordinate-signal detection circuit. The X-signal separation circuit 77 is a circuit for allowing signals to pass only during the X-coordinate detection period T2 from the inputted electronic-pen output signal PSG. The X-signal separation circuit 77 is constituted of a capacitor 121, an analog switch 122, a resistor 123, and an amplifier 124. The output terminal of the amplifier 62 of the electronic pen 6 is connected to the input terminal of the analog switch 122 through the capacitor 121. Further, the control circuit 9 is also connected to the control input terminal of the analog switch 122. The output terminal of the analog switch 122 is connected to ground through the resistor 123, and is also connected to the input terminal of the amplifier 124. The output terminal of the amplifier 124 is connected to the first BPF 78.

Figure 26:
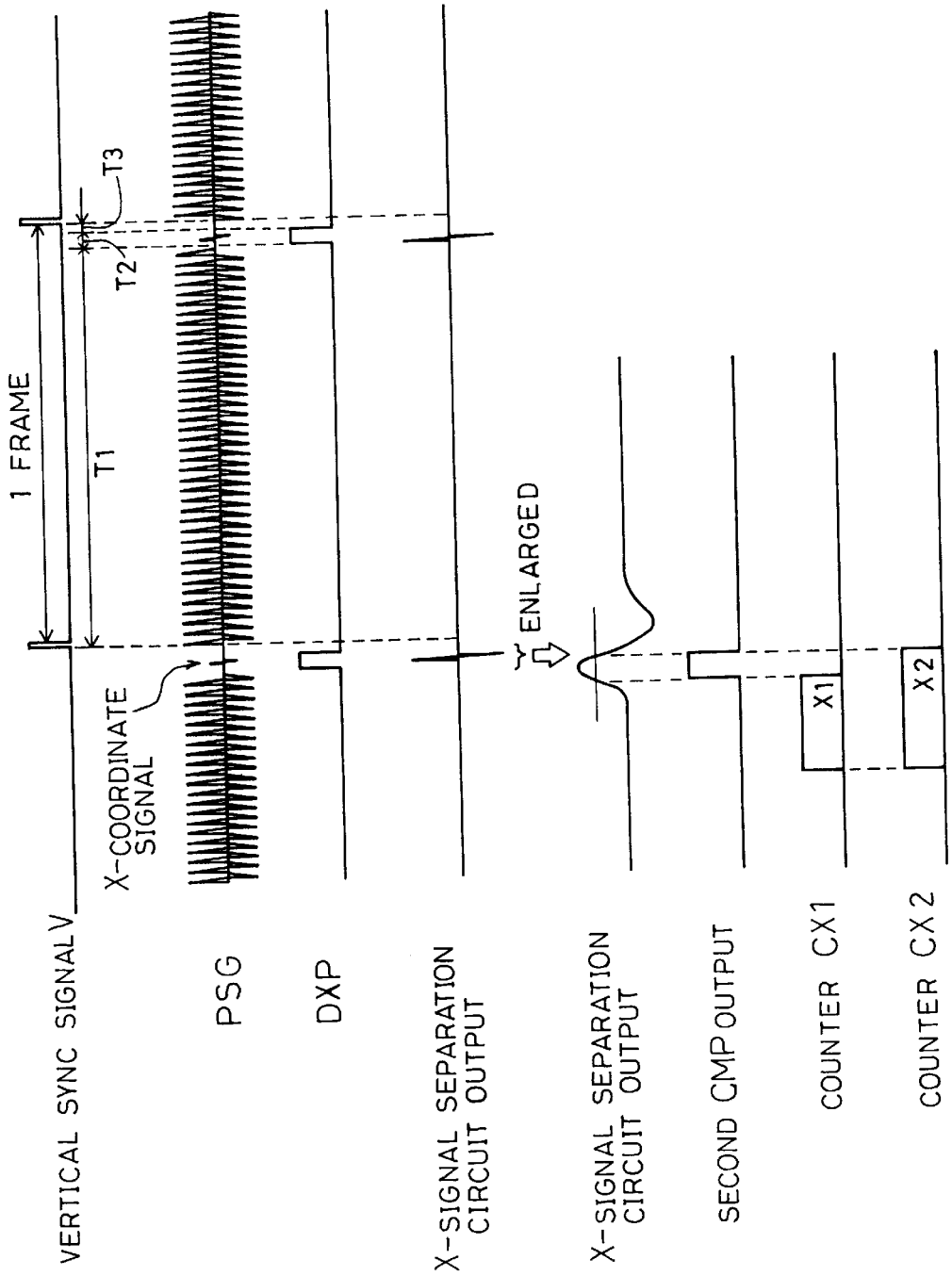
FIG. 26 is a timing chart showing X-coordinate-detecting operations by the X-coordinate-signal detection circuit and the coordinate-detection logic.

With this arrangement, as illustrated in FIG. 26, a controlling signal DXP with "High" level is supplied to the input terminal of the analog switch 122 from the control circuit 9, the analog switch 122 turns "on" so that the X-coordinate signal in the electronic-pen output signal PSG is supplied to the amplifier 124 where it is amplified and outputted from its terminal. As shown in the third stage of FIG. 26, the controlling signal DXP is a signal that is held "High" during the X-coordinate detection period T2. In contrast, when the controlling signal DXP with "Low" level is supplied to the input terminal of the analog switch 122, the analog switch 122 turns "off", thereby blocking the transmission of the electronic-pen output signal PSG.

Referring to a timing chart in FIG. 26 and FIG. 17, the following description will discuss operations of the above-mentioned X-coordinate-signal detection circuit.

The electronic-pen output signal PSG and the controlling signal DXP from the control circuit 9 are supplied to the X-signal separation circuit 77. The X-coordinate signal (see the fourth and fifth stages of FIG. 26), which has been extracted from the electronic-pen output signal PSG by the X-signal separation circuit 77 as described earlier, has its signal component properly extracted by the first BPF 78, and the resulting signal is supplied to one of the input terminals of the second CMP 79. Here, the output signal from the third LPF 76, that is, the signal obtained by detecting the magnitude of the polarity-inversion signal, is applied to the other input terminal of the second CMP 79.

The X-coordinate signal, inputted to the second CMP 79, is formed into an X-coordinate-detection signal CX that has timings of rise and fall in the vicinity of the threshold value, and is inputted to the coordinate-detecting logic 19.

In addition to the counter CY1 and the counter CY2, the coordinate-detecting logic 19 also has a counter CX1 and a counter CX2. The coordinate-detecting logic 19 provides a true X-coordinate value in the same manner as described in the Y-coordinate-detecting operations. In other words, supposing that the coordinate value obtained by the counter CX1 is X1 and that the coordinate value obtained by the counter CX2 is X2, the true coordinate value X is represented by:

$$X=(X1+X2)/2 \qquad (2)$$

Figure 25:
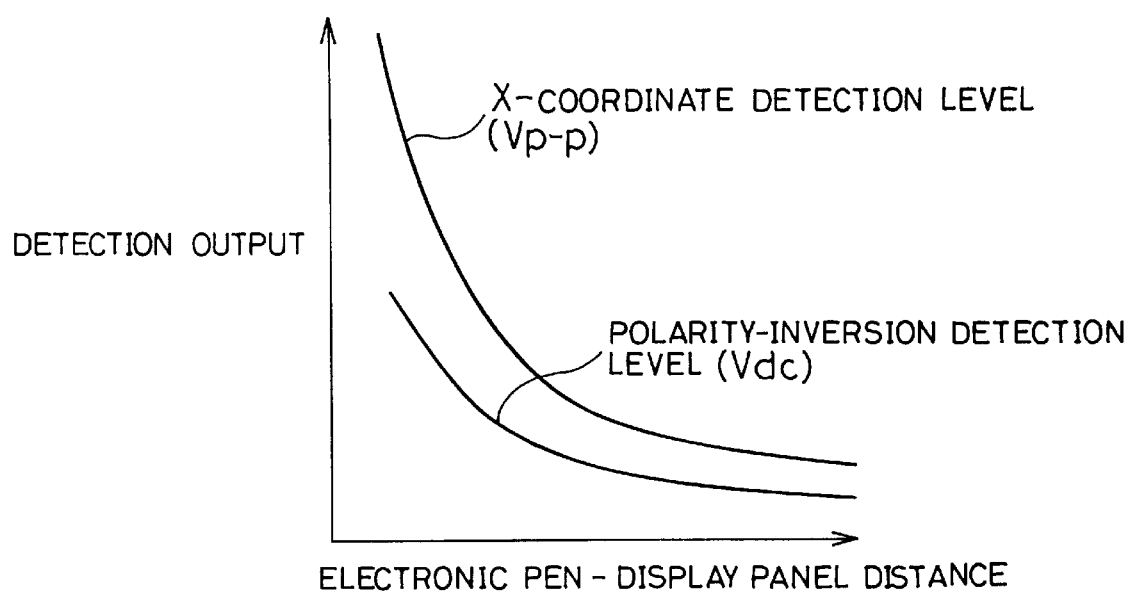
FIG. 25 is a graph showing the X-coordinate-detecting characteristics and the polarity-inversion detecting characteristics.

FIG. 25 shows characteristics of the X-coordinate signal and the polarity-inversion signal that are inputted to the second CMP 79 with respect to the distance between the electronic pen 6 of the detection electrode 61 and the display panel 1. In the same manner as the Y-coordinate detection, the ratio of detection level of the X-coordinate signal and the polarity-inversion signal is always held at a constant value with respect to the distance between the detection electrode 61 and the display panel 1; therefore, it is possible to obtain a stable X-coordinate detecting operation independent of the height of the electronic pen 6 (the position in a direction perpendicular to the display-panel surface).

Next, research was made to check the differences of output states in respective cases when the first BPF 78 is changed to a LPF, a HPF (high-pass filer) and a BPF.

Figure 30A:
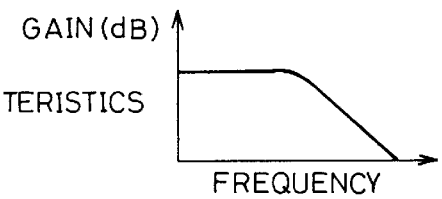
FIG. 30($a$) is a graph showing frequency characteristics of LPF.
Figure 30B:
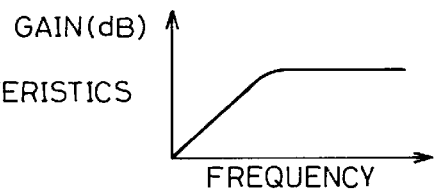
Figure 30C:
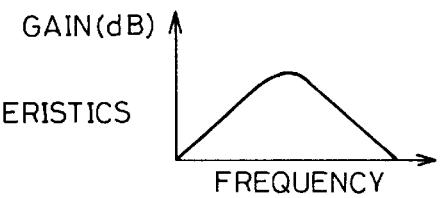
Figure 31:
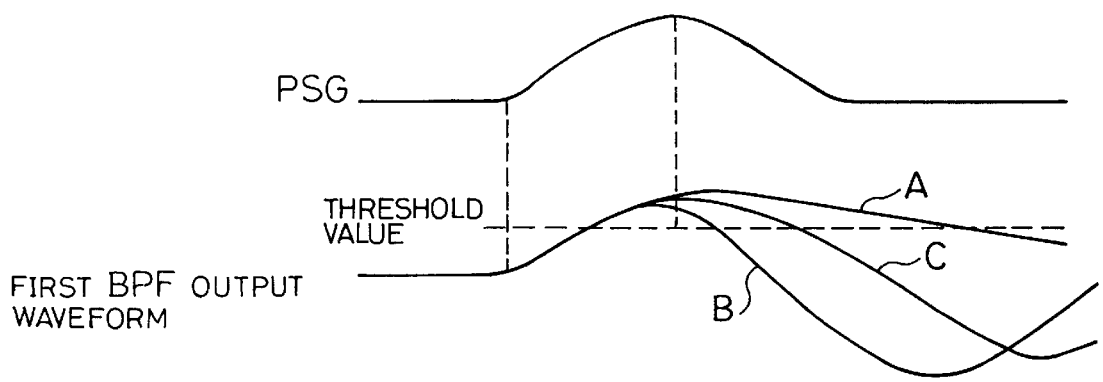
FIG. 31 is a waveform diagram that shows the relationships between the coordinate-detecting accuracy and the output waveforms of the first BPF that are given as LPF, HPF and BPF respectively.

The respective frequency characteristics of the LPF, HPF and BPF are, for example, shown in FIGS. 30(a) through 30(c). The LPF is used for eliminating high-frequency components from the signal (see FIG. 30(a)). The HPF is used for eliminating low-frequency components from the signal (see FIG. 30(b)). The BPF extracts a signal having a predetermined frequency band (see FIG. 30(c)). When the three types of filters are respectively placed at the position of the first BPF 78, the filters release waveforms as shown in FIG. 31. In other words, in the case of the LPF, the output waveform A has a steeper rising slope compared with a falling slope when it instantaneously crosses the threshold value. In contrast, in the case of the HPF, the output waveform B has a gentler rising slope compared with a falling slope. In the case of the BPF, it is possible to make the slopes of the rising and falling portions of the output waveform C equal to each other by properly adjusting the frequency characteristics. This indicates that when the output waveform of the filter crosses the threshold value, its falling slope is dependent on the frequency characteristics of the filter. Here, the waveform shown in the upper stage of FIG. 31 is a waveform from the electronic-pen output signal PSG.

Figure 32:
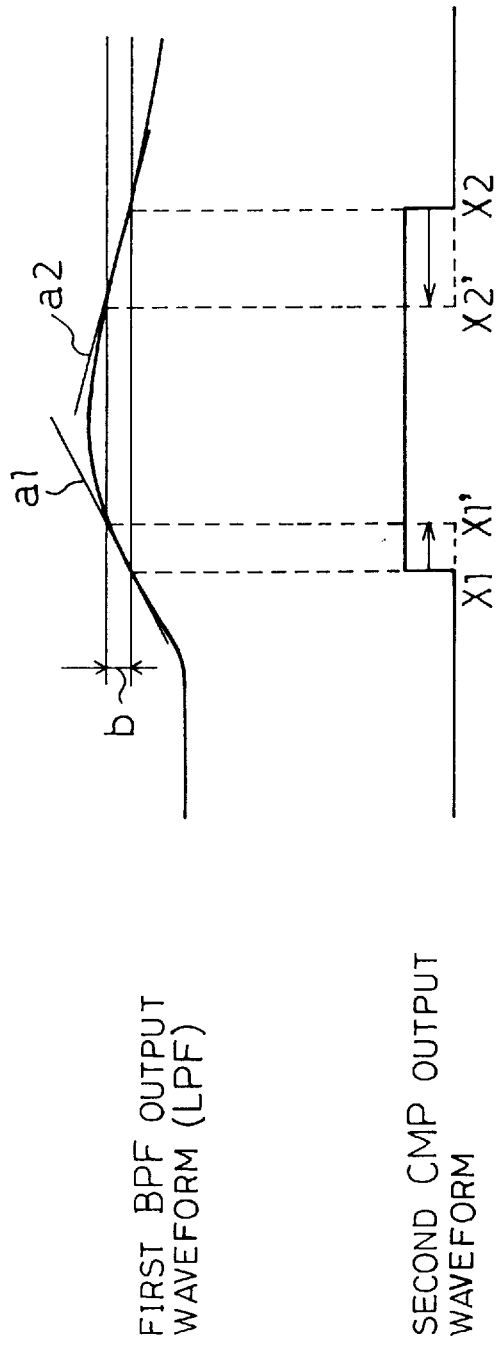
FIG. 32 is a waveform diagram that shows the relationship between the output waveform of the first BPF that is given as LPF and the output waveform of the second CMP.

In this case, with respect to the filter, it is preferable to adopt a BPF which has the same slopes in the rising and falling portions. The reason for this is given as follows: As illustrated in FIG. 32, when a LPF is used as the first BPF 78, the slope a1 of the rising portion of the output waveform is greater than the slope a2 of the falling portion thereof. At this time, if the output waveform is fluctuated by b due to low-band components, the true X-coordinate value, given by the aforementioned equation (2), has a fluctuation $\Delta T$ during the measured time that is represented by:

$$\Delta T = X - X'$$
$$= (a1 - a2)/b.$$

Here, X and X' are represented by:

$$X=(X1+X2)/2$$
$$X'=(X1'+X2')/2.$$

If the slope a1 and the slope a2 of the rising and falling portions are made equal to each other, the fluctuation $\Delta T$ during the measured time of the true X-coordinate value given by the aforementioned equation (2) is set to 0, even if the output waveform is fluctuated by b due to low-band components. Therefore, the adoption of a BPF as the filter makes it possible to provide highly-accurate coordinate detection with high resistance to noise.

(6-4) Noise-signal detection circuit

In general, a fluorescent lamp of the high-frequency lighting type is adopted as a backlight used for illuminating the liquid crystal. Here, frequencies in the vicinity of several tens kHz are used for the driving frequency of the backlight, and since the high voltage generated by the driving circuit is supplied to the backlight through a lead wire, serious electrostatic interference is caused in the surrounding areas. Moreover, since fluorescent lamps of the high-frequency lighting type are used in many places, it is quite possible that the display-integrated type tablet device of the present embodiment is used in the proximity of these equipment causing such electrostatic interference. When used in such bad conditions, the device is adversely affected by electrostatic interference having a level greater than the coordinate detection signal that is to be detected; this causes degradation in detection accuracy as well as malfunction. More specifically, the spectrum of the X-coordinate signal is distributed over frequencies from 20 to 100 kHz, while most of inverter fluorescent lamps of the high-frequency lighting type cover from 30 to 50 kHz; therefore, the X-coordinate signal has overlapped components with the interfering noise. In such a case, the operation of the tablet is adversely affected, and tends to cause maldetection of the coordinates. For example, even if a straight line is drawn, it might become a curved line, or in the case of icons, an unwanted icon input operation might be made. The noise-signal detection circuit, which detects the electrostatic interference, is used for supplying information to the user and nullifying an unwanted coordinate input.

Figure 28:
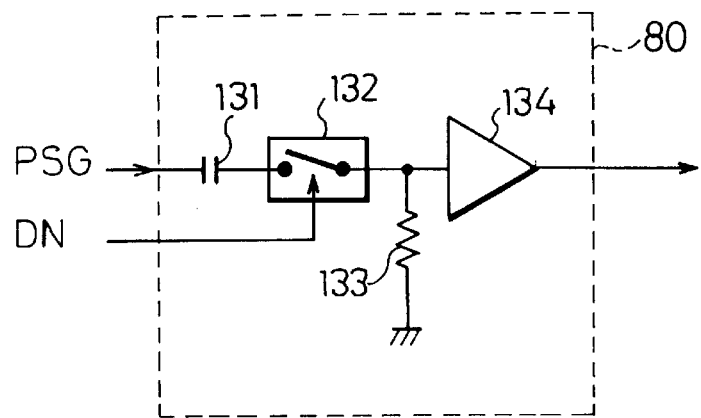
FIG. 28 is a circuit diagram showing a structural example of an interfering-noise separation circuit in the coordinate detection circuit.

FIG. 28 shows a specific circuit diagram of an interfering-noise separation circuit 80 in the noise-signal detection circuit. The interfering-noise separation circuit 80 is a circuit that passes signals from the inputted electronic-pen output signal PSG only during the noise detection period T3. The interfering-noise separation circuit 80 is constituted of a capacitor 131, an analog switch 132, a resistor 133 and an amplifier 134, and has a circuit construction similar to that of the X-signal separation circuit 77.

Figure 24:
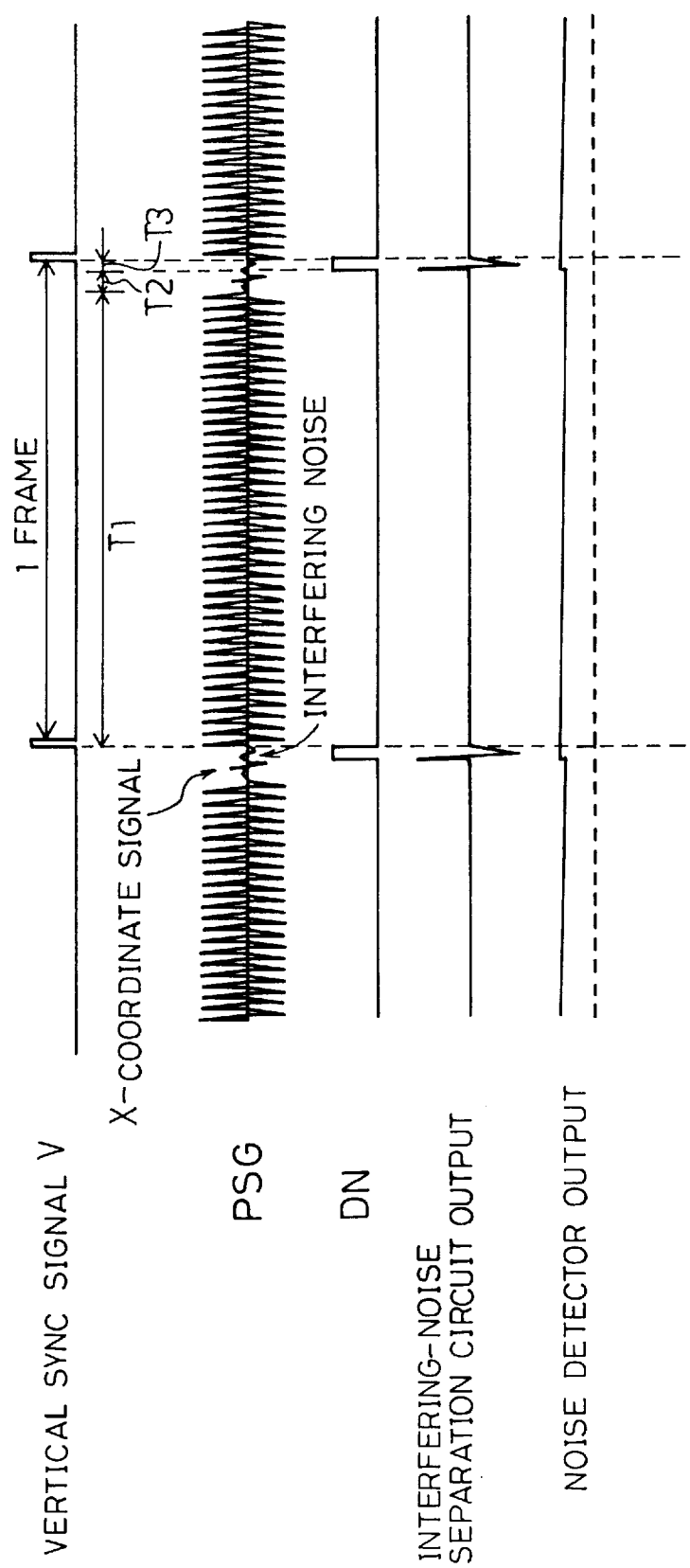
FIG. 24 is a timing chart showing noise-signal separating operations by a noise-signal detection circuit in the coordinate detection circuit.

With this arrangement, the electronic-pen output signal PSG is inputted to the analog switch 132 through the capacitor 131. When the controlling signal DN from the control circuit 9 is held "High", the analog switch 132 is "on", thereby activating the amplifier 134. In other words, only the signal that is induced in the detection electrode 61 when the controlling signal DN is held "High" is amplified, and released from the terminal of the amplifier 134. As shown in FIG. 24, since the controlling signal DN is held "High" only during the noise detection period T3, only the noise signal appears on the terminal of the amplifier 134.

Figure 29:
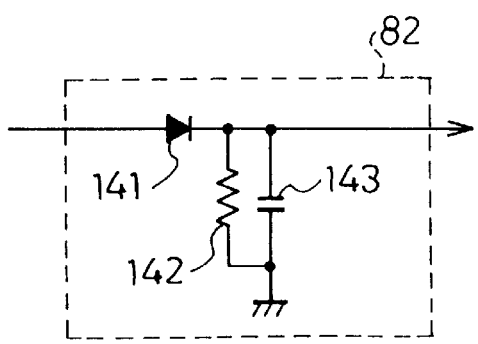
FIG. 29 is a circuit diagram showing a structural example of a noise detector in the coordinate detection circuit.

FIG. 29 shows a specific circuit diagram of the noise detector 82. The noise detector 82 is constituted of a diode 141, a discharge resistor 142, and a capacitor 143, and converts the magnitude of the noise signal that has been applied onto the terminal of the amplifier 134 into a dc voltage.

Referring to a timing chart in FIG. 24 and FIG. 17, the following description will discuss operations of the above-mention noise-signal detection circuit.

The electronic-pen output signal PSG and the controlling signal DN are supplied to the interfering-noise separation circuit 80. As described above, only the interfering noise is separated by the interfering-noise separation circuit 80 during the noise detection period T3, and is supplied to the second BPF 81. The interfering noise, from which target frequency components have been effectively extracted in the second BPF 81, is rectified and detected by the noise detector 82, and the resulting dc voltage that is proportional to the magnitude of the noise is supplied one of the terminals of the fourth CMP 84. Since a threshold-value voltage THN has been applied to the other terminal of the fourth CMP 84, the fourth CMP 84 is allowed to output a noise detection signal N. In other words, when great interfering noise exists in the proximity of the device, the output from the noise detector 82 becomes greater than the threshold-value voltage THN so that the noise detection signal N with "High" level is detected. Here, the above-mentioned threshold-value voltage THN is preferably set so as to meet the magnitude of noise to be detected.

In such a state where interfering noise is detected, the X-coordinate detection signal CX and the Y-coordinate detection signal CY become undetermined due to the interfering noise, that is, merely poor detection accuracy is available; however, this arrangement makes it possible to execute compensation and interpolation in a manner free from loss of coordinates by utilizing the interfering noise in the coordinate-detecting logic 19.

Additionally, it is preferable to make the frequency characteristics of the second BPF 81 and the frequency characteristics of the first BPF 78 equal to each other. Then, it becomes possible to accurately judge the degree at which interfering noise having the same frequency spectrum as the X-coordinate signal is contained. That is, as described above, by installing the noise detection period T3 that is separated from the X-coordinate detection period T2 on the time basis and by arranging the second BPF 81 and the first BPF 78 to have the same frequency characteristics, it is possible to accurately evaluate only interfering noise components having the same frequency components as the X-coordinate signal. As a result, even in the case of high degree of interference or other cases, it is possible to carry out an appropriate pen-input prohibiting operation.

Here, it is supposed that the interfering noise is always generated continuously. Further, in the above arrangement, interfering noise with respect to the X-coordinate signal is detected. This is because, since the Y-coordinate signal is synchronously detected and since its driving voltage is comparatively large, the X-coordinate signal is subjected to the adverse effects from the interfering noise prior to the Y-coordinate signal.

As described above, in the display-integrated type tablet device of the present embodiment, upon driving the row electrodes G, the row-electrode driving circuit 2 releases the row-electrode scanning signals g which exert electric potential changes in the row electrodes G, in order to detect the Y-coordinate, and the row-electrode scanning signals g are simultaneously inputted to two of the row electrodes G.

Since the row-electrode scanning signals g are simultaneously inputted to the two row electrodes G, it is possible to make greater the electrostatic coupling capacity generated between the electronic pen 6 and the row electrodes G. Consequently, an induced voltage that is greater than the voltage conventionally induced is exerted in the electronic pen 6, the signal to be inputted from the electronic pen 6 to the Y-coordinate-signal detection circuit is increased, a high S/N ratio is provided, and the Y-coordinate is obtained with high-accuracy.

Moreover, the display-integrated type tablet device is provided with the start-pulse-width expanding circuit 17 that is connected to the row-electrode driving circuit 2, and that expands and converts the start pulse signal spv1 having the same pulse width as the horizontal sync signal H into the shift data signal spv2 having a pulse width corresponding two clocks of the horizontal sync signal H while synchronizing with the vertical sync signal V that indicates the start of the display period (Y-coordinate detection period) T1, and also provided with the delay circuit 18 that is connected to the column-electrode driving circuit 3 and that delays image data by one clock. Moreover, the row-electrode driving circuit 2 is provided with the shift register 21 that generates a driving signal for carrying out image display in response to the shift data signal spv2, and successively outputs the driving signals to the row electrodes G so that the driving signals have an overlapped time corresponding to one clock with each other, and also provided with the AND gate 24 that is connected to the shift register 21, and that generates the row-electrode scanning signal g by blocking a part of the driving signal for a predetermined period of time at a predetermined timing.

With this arrangement, the shift data signal spv2, which has been generated by the start-pulse-width expanding circuit 17, is inputted to the row-electrode driving circuit 2. Then, the shift register 21 in the row-electrode driving circuit 2 generates a driving signal used for carrying out image display. The AND gate 24 modifies the driving signal so that it has an instantaneous "off" time, thereby generating the row-electrode scanning signal g that exerts a change in the electric potential of the row electrode. In this case, since the driving signals that are successively supplied to two of the row electrodes G have the overlapped time with each other, the delay circuit 18 transmits image data with a delay of this overlapped time. That is, the image is displayed without overlapping portions.

Thus, it is possible to achieve an arrangement for simultaneously inputting the row-electrode scanning signals g to two of the row electrodes G by merely adding a simple component to a conventional device.

Moreover, the display-integrated type tablet device of the present invention is provided with the noise-signal detection circuit for detecting interfering noise externally merged, during a period other than the driving period of the row electrodes G and the column electrodes S, that is, during the noise detection period T3.

This arrangement makes it possible to judge the reliability of the X- and Y-coordinate signals. As a result, even when there is an electrostatic interfering noise source, it is possible to carry out compensation and interpolation for coordinates that have been erroneously detected due to the interfering noise.

Furthermore, in the display-integrated type tablet device, the Y-coordinate-signal detection circuit and the X-coordinate-signal detection circuit are respectively provided with the first LPF 72 and the first BPF 78, each of which extracts a signal from the electronic pen 6 that ranges within a desired frequency band, and the first CMP 73 and the third CMP 83 that detect Y and X coordinates by comparing the signals that have passed through the two filters with respective threshold values. In this case, in the waveforms of the signals that have passed through the two filters, the rate of change in the rising time in the vicinity of the threshold value and the rate of change in the falling time in the vicinity of the threshold value are optimized to have absolute values that are equal to each other with polarities reversed to each other.

Therefore, even if each of the signals that have passed through the two filters is fluctuated by a low-frequency-band component, no time-wise fluctuation is caused in the positional information. Thus, it becomes possible to detect coordinates with high accuracy, even under intensity-fluctuations in positional information and noise with low frequencies.

Moreover, the display-integrated type tablet device of the present invention is provided with the control circuit 9 which controls in such a manner that the Y-coordinate-signal detection circuit allows the Y-coordinate signal to pass for a period of time longer than the time during which the AND gate 24 blocks one portion of the driving signal.

With this arrangement, it becomes possible to effectively use both of the energies of the electric potentials of the row electrode G in its rising and falling states. As a result, the S/N ratio of the detected Y-coordinate signal is increased, and the detection accuracy is improved.

Furthermore, the display-integrated type tablet device of the present embodiment is provided with the display control circuit 4 that generates a clock signal ck1 having the same cycle as the horizontal sync period of image display, which indicates the timing of the polarity inversion for a signal generated in the electronic pen 6, and a clock signal ck2 having the same cycle as the clock signal ck1 with the different phase, which indicates the timing for detecting the Y-coordinate signal. Here, the display control circuit 4 makes the phase-difference time between the clock signal ck1 and the clock signal ck2 longer than the transitional response time of the Y-coordinate signal.

This arrangement makes it possible to minimize influences from the polarity inversion that are imposed on the Y-coordinate signal. As a result, it is possible to provide a Y-coordinate signal having a good S/N ratio.

Figure 38:
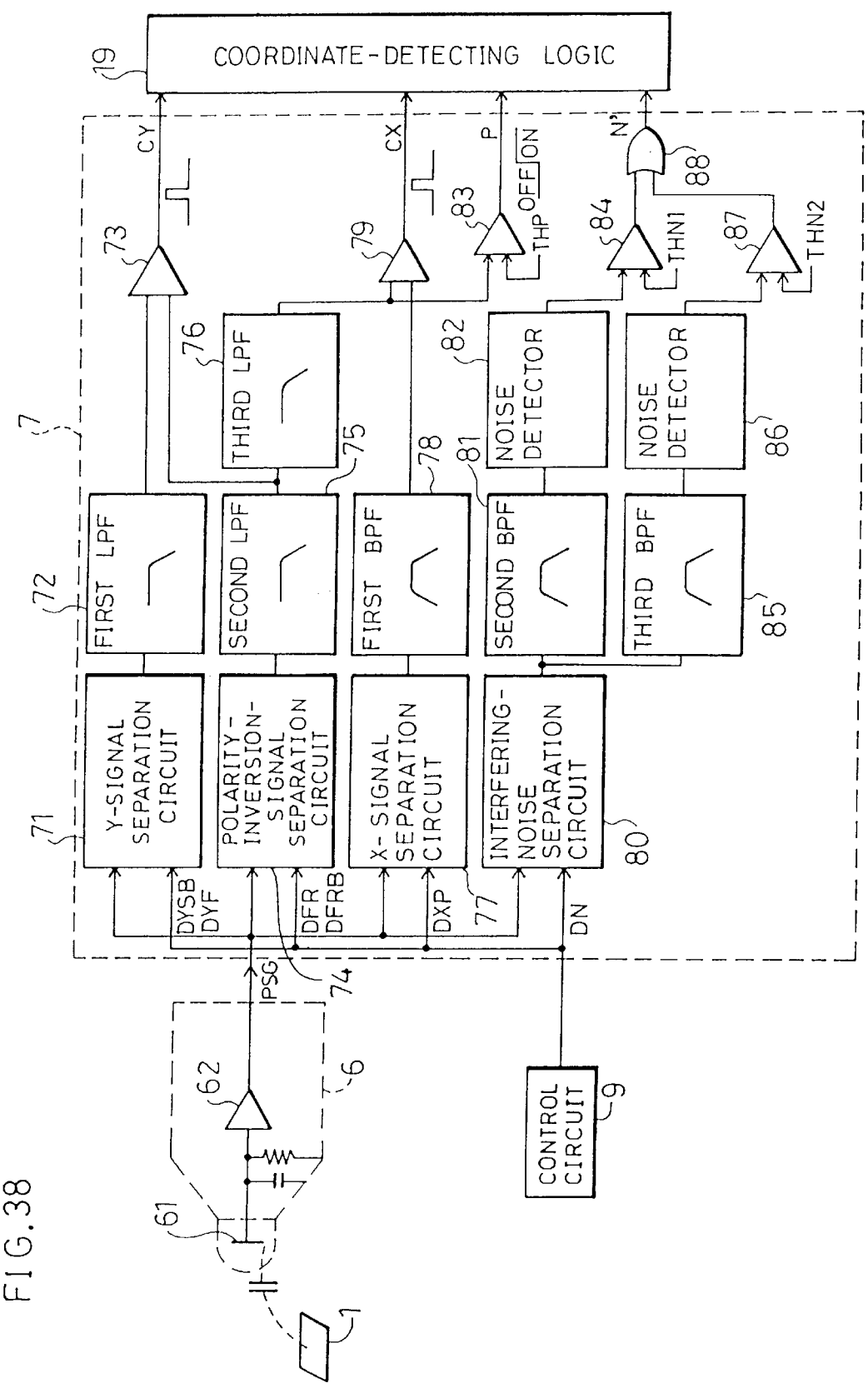
FIG. 38 is a block diagram showing another structural example of a noise-signal detection circuit in the coordinate detection circuit.
Figure 39:
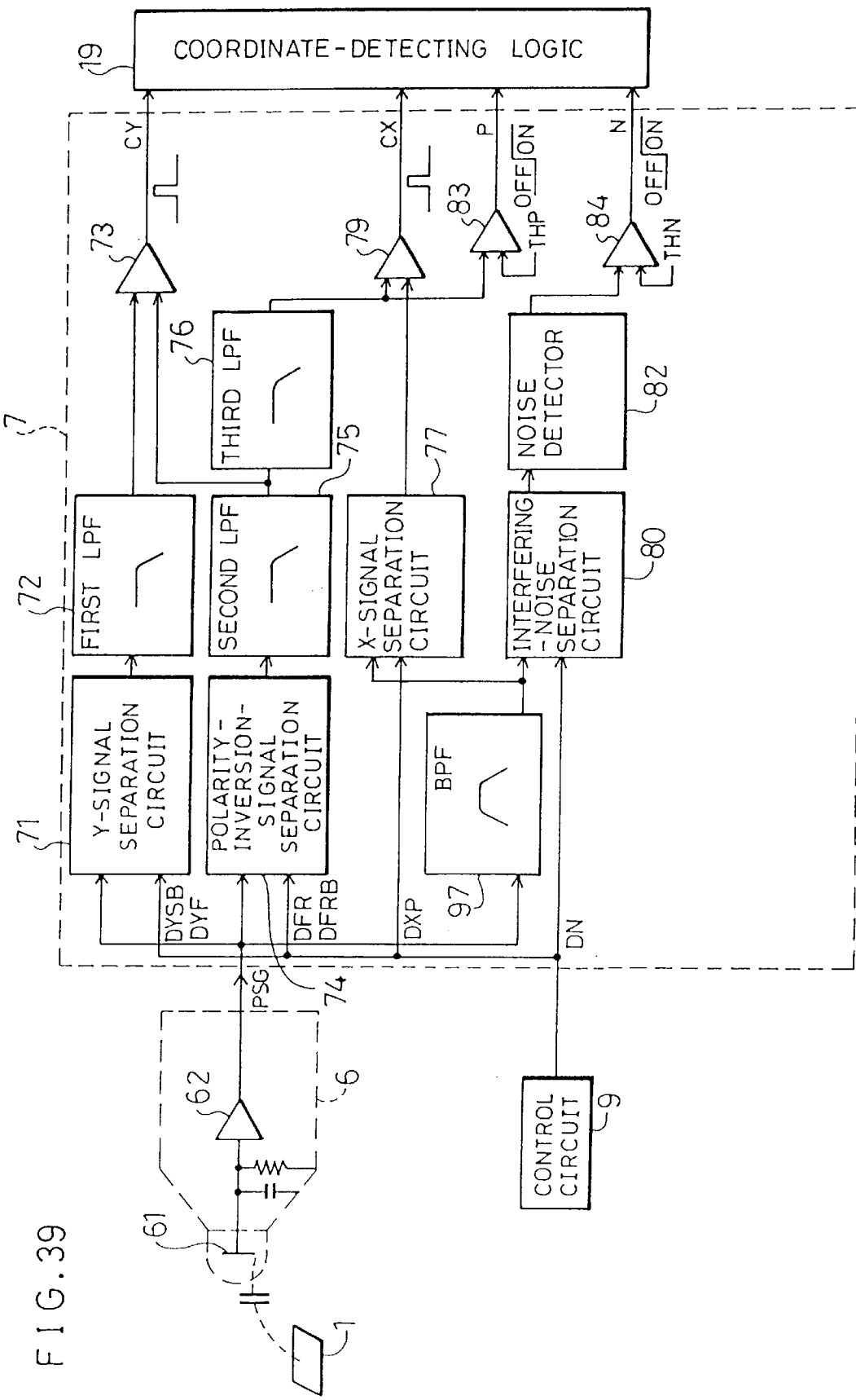
FIG. 39 is a block diagram showing another structural examples of an X-coordinate-signal detection circuit and a noise-signal detection circuit in the coordinate detection circuit.
Figure 40:
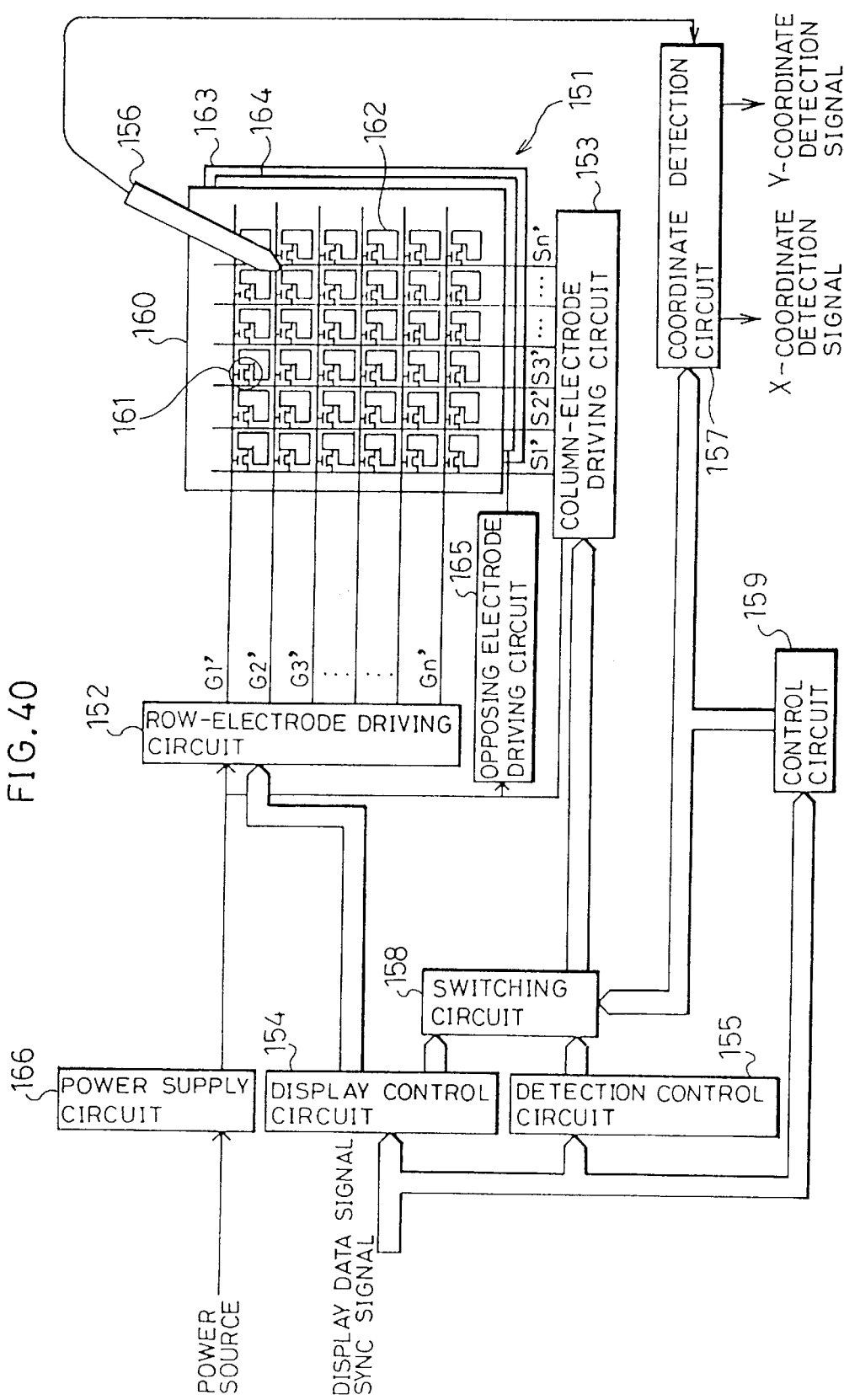
FIG. 40 is a block diagram showing a construction of a conventional display-integrated type tablet device.
Figure 41:
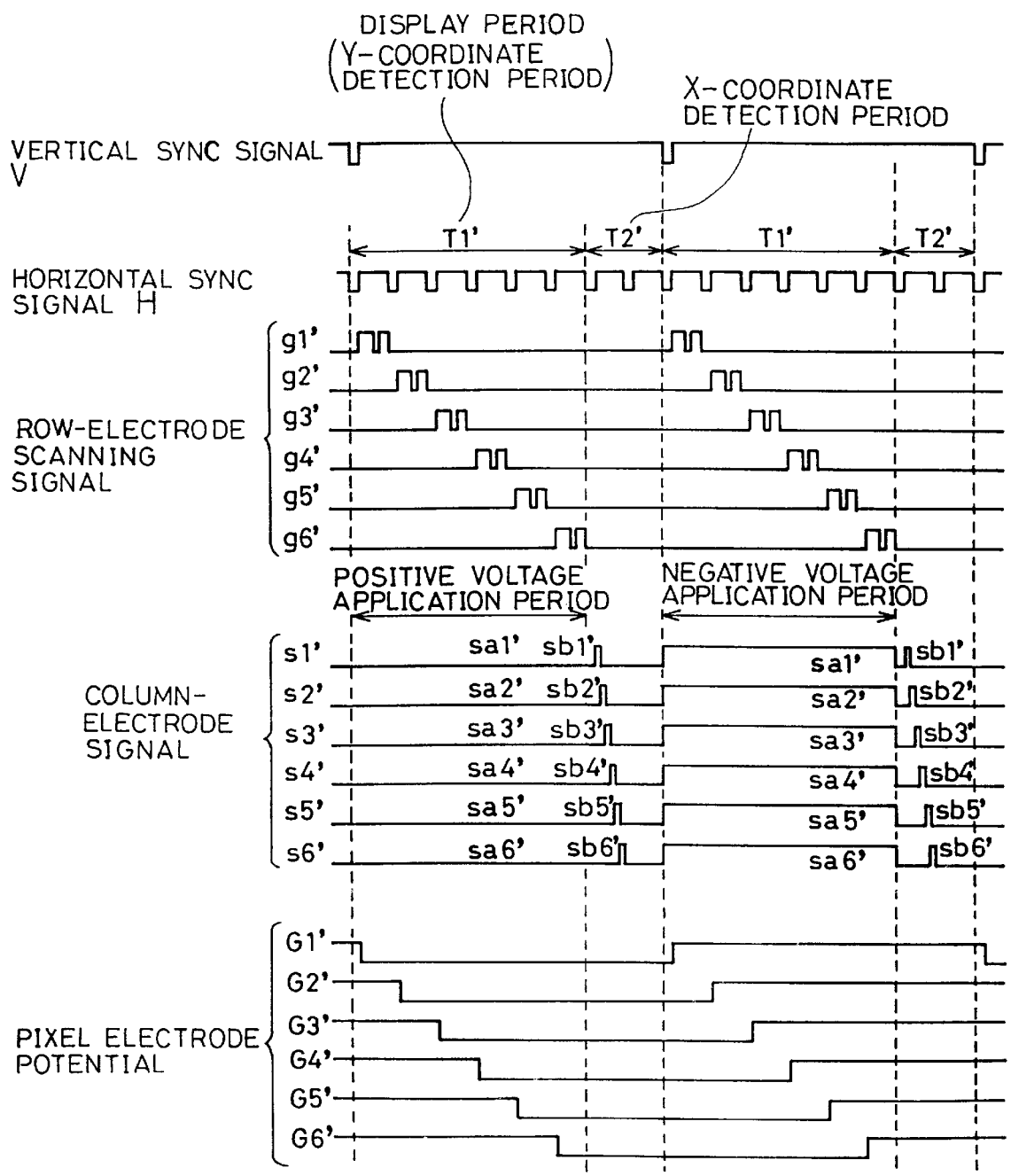
FIG. 41 is a timing chart showing operations of the above-mentioned display-integrated type tablet device.

Additionally, the noise-signal detection circuit is not intended to be limited to the arrangement of FIG. 17, and an arrangement shown in FIG. 38 may be adopted.

In order to accurately detect interfering noise over the Y-coordinate signal, the noise-signal detection circuit is further provided with the third BPF 85, a noise detector 86, the fifth CMP 87 and an OR gate 88, in addition to the interfering-noise separation circuit 80, the second BPF 81, the noise detector 82 and the fourth CMP 84.

The third BPF 85, the noise detector 86 and the fifth CMP 87 are connected in the same manner as the second BPF 81, the noise detector 82 and the fourth CMP 84, and these two sets of components are aligned in parallel with each other. The output terminals of the fourth and fifth CMP 84 and 87 are respectively connected to the two input terminals of the OR gate 88. Further, the output terminal of the OR gate 88 is connected to the coordinate-detecting logic 19. In this case, the frequency band of the second BPF 81 is set to match the frequency band of the X-coordinate signal, and the frequency band of the third BPF 85 is set to match the frequency band of the Y-coordinate signal that is narrower than the former. For example, the frequency band of the second BPF 81 ranges from 20 to 100 kHz and the frequency band of the third BPF 85 ranges from 30.5 to 32.5 kHz, which is narrower than the above range.

As described earlier, in the above arrangement, the interfering noise, which has been separated by the interfering-noise separation circuit 80 during the noise detection period T3, passes through the second BPF 81, is detected by the noise detector 82, and compared with the threshold value THN1 in the fourth CMP 84 so as to be converted into a signal with "0" (Low level) or "1" (High level). Similarly, the interfering noise, which has passed through the third BPF 85 and the noise detector 86, is compared with the threshold value THN2 in the fifth CMP 87 so as to be converted into a signal with "0" or "1". These signals, thus converted, are detected by the OR gate 88 as noise detection signals N'. At this time, both of the input signals to the OR gate 88 are "0", the noise detection signal N' becomes "0", and upon receipt of combinations other than this, the noise detection signal N' becomes "1".

Since this arrangement detects interfering noise over the X- and Y-coordinate signals, it becomes possible to carry out further accurate compensation and interpolation.

Moreover, a BPF may be commonly used in the noise-signal detection circuit and the X-coordinate-signal detection circuit. In other words, in the arrangement shown in FIGS. 17 and 38, interfering-noise-signal components that give adverse effects on the coordinate-signal components are extracted by matching the frequency characteristics of the first BPF 78 and the second BPF 81; however, as shown in a circuit construction of FIG. 39, a BPF 97 may be commonly used as the X-coordinate-signal detection circuit and the noise-signal detection circuit.

In this case, the X-coordinate-signal detection circuit is constituted of a polarity-inversion-signal separation circuit 74, the second and third LPFs 75 and 76, a BPF 97, an X-signal separation circuit 77, and the second CMP 79. The input side of the BPF 97 is connected to the output terminal of the amplifier 62 of the electronic pen 6, and the output side is connected to the input side of the X-signal separation circuit 77. Further, the control circuit 9 is also connected to the input side of the X-signal separation circuit 77. Moreover, the output side of the X-signal separation circuit 77 is one of the input terminals of the second CMP 79. Here, the polarity-inversion-signal separation circuit 74, the second and third LPFs 75 and 76 and the second CMP 79 are connected in the same manner as described above.

The noise-signal detection circuit is constituted of the BPF 97, the interfering-noise separation circuit 80, the noise detector 82 and the fourth CMP 84. The output side of the BPF 97, as well as the control circuit 9, is connected to the input side of the interfering-noise separation circuit 80. Further, the output side of the interfering-noise separation circuit 80 is connected to the input side of the noise detector 82. Here, the noise detector 82 and the fourth CMP 84 are connected as described earlier.

In the same manner as described in FIG. 17, in this arrangement, the X-coordinate-signal detection circuit converts only the X-coordinate signal contained in the electronic-pen output signal PSG into a pulsed form, and outputs the resulting X-coordinate detection signal CX. Further, the noise-signal detection circuit detects only the interfering noise contained in the electronic-pen output signal PSG as the noise detection signal N.

In addition to the effect for providing noise separation with high accuracy, this arrangement makes the size of the coordinate detection circuit 7 smaller.

Additionally, in the present embodiment, a LPF is used as the filter (the first LPF 72) of the Y-coordinate-signal detection circuit is provided, but a BPF may be adopted instead thereof. Moreover, in this case, the BPF may be commonly used in the Y-coordinate-signal detection circuit as well as in the noise-signal detection circuit; therefore, it is possible to make the size of the coordinate detection circuit 7 smaller.

Moreover, in the present embodiment, the row-electrode scanning signals g are simultaneously applied to two of the row electrodes G; however, the row-electrode scanning signals g may be simultaneously applied to three or more of the row electrodes G. In this case, the delay circuit 18 is designed in the corresponding manner.

Figure 36:
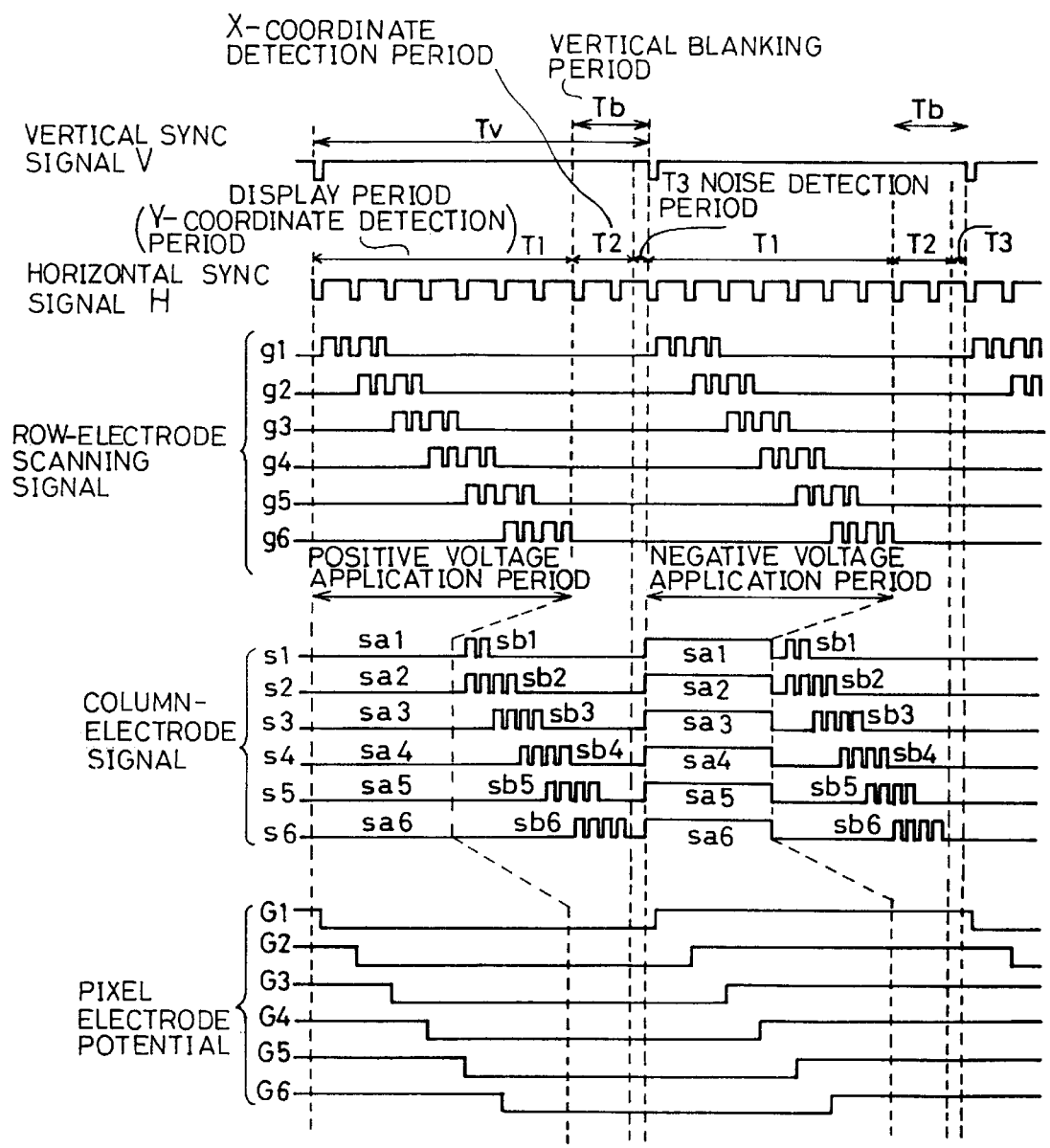
FIG. 36 is a timing chart in the case when a column-electrode scanning signal is simultaneously applied to two column-electrodes.

Furthermore, in the present embodiment, the column-electrode scanning signals sb are successively applied to the column electrodes S with their pulses having no overlapped portion; however, as shown in FIG. 36, they may be simultaneously applied to two or more of the column electrodes S in the same manner as the row electrodes G. As a result, the detection accuracy for the X-coordinate is improved by the same effects as obtained in the row electrodes G. In this case, however, a complicated circuit construction is needed for the column-electrode driving circuit 3.

Additionally, Japanese Laid-Open Patent Publication 314166/1991 (Tokukaihei 3-314166) discloses a construction of a display-integrated type tablet device wherein a TFT liquid crystal panel is used. In this case, in order to obtain a coordinate detection signal without causing adverse effects on display quality, only one row electrode needs to be selected and changed during the row-electrode scanning operation. In other words, in the driving operation for displaying a TFT liquid crystal panel, while display data is supplied to the column electrodes, only one row electrode needs to be selected so as to select only the display electrode that corresponds to the row electrode.

Moreover, Japanese Laid-Open Patent Publication 53726/1993 (Tokukaihei 5-53726) discloses a construction wherein voltages are simultaneously applied to a plurality of row electrodes (or column electrodes) with reference to FIG. 7. In this scanning operation, a-number of electrodes are subjected to shifts corresponding to a-number for each clock cycle at the same time. Therefore, if this method is applied to the row electrodes, images corresponding to a-number of rows in the longitudinal direction (the directing crossing the row electrodes) all have the same luminance value, thereby causing serious adverse effects on image quality.

In contrast, in the present invention, as illustrated in FIG. 3, a-number of row electrodes G (two in the present embodiment) are merely subjected to a shift corresponding to one row for each clock cycle. In other words, the row-electrode scanning signal g has a transfer speed for scanning only the electrode-to-electrode distance corresponding to one row of the row electrodes G per unit time (1H) of the horizontal sync signal H. For this reason, as illustrated in FIG. 11, pixels corresponding to the respective row electrodes are allowed to have independent data written therein in the longitudinal direction; this prevents degradation in display quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display-integrated type tablet device comprising:
   a pair of transparent substrates that are placed face to face with each other with an electro-optical material being interpolated in between;
   a plurality of first electrodes that are disposed on one surface of the transparent substrate in parallel with one another;
   a plurality of second electrodes that are disposed in parallel with one another in a manner orthogonal to the first electrodes;
   a plurality of switching elements, each being disposed at an intersecting position between the corresponding first and second electrodes and connected to the corresponding first and second electrodes;
   a plurality of pixel electrodes that are disposed in a matrix form, each being connected to the corresponding switching elements;
   first and second electrode driving means for driving the first and second electrodes;
   input means that is electrostatically coupled with the first and second electrodes;
   first positional-information detection means which, during a display period in which an image is written to the electro-optical material and a resulting display is made by selectively operating the switching elements by allowing the first and second electrode driving means to drive the first and second electrodes, detects first positional-information that indicates an input position by the input means when the first electrodes are driven; and
   second positional-information detection means which, during a period except for the display period, detects second positional-information that indicates an input position by the input means when the second electrodes are driven,
   wherein the first electrode driving means, upon driving the first electrodes, outputs scanning signals so that a potential change is exerted in each of the first electrodes so as to detect the first positional-information, and also inputs the scanning signals to the corresponding first electrodes so that a potential change is simultaneously generated in at least two of the first electrodes, the scanning signal being provided with a transfer speed for scanning only the electrode-to-electrode distance corresponding to one of the first electrodes per unit time of a basic clock for driving the first electrode driving means.

2. The display-integrated type tablet device as defined in claim 1, wherein: the first electrode driving means is provided with:
   a sequential output section that generates driving signals for displaying images, and that sequentially outputs the driving signals to the first electrodes so that the driving signals to be applied to at least two of the first electrodes have an overlapped time with each other; and
   a gate section that is connected to the sequential output section, and that generates the scanning signal for detecting the first positional information by blocking one portion of the driving signal with a predetermined timing for a period of time that allows the first electrode to have a change in electric potential.

3. The display-integrated type tablet device as defined in claim 2, further comprising:
   pulse-width expanding means that expands and converts a signal having the first pulse width into a display-controlling signal having the second pulse width wider than the first pulse width while synchronizing with the reference signal that indicates the start of the display period, and that inputs the display-controlling signal to the first electrode driving means; and delay means that delays image data by the overlapped time of the driving signals so as to input the resulting image data into the second electrode driving means, wherein the first electrode driving means generates driving signals for displaying images in accordance with the display-controlling signal.

4. The display-integrated type tablet device as defined in claim 2, further comprising:

control means that controls the first positional-information detection means in such a manner that the first positional-information detection means allows the signal for obtaining the first positional information to pass for a period of time longer than the time during which the gate section blocks the one portion of the driving signal.

5. The display-integrated type tablet device as defined in claim 2, further comprising:

an opposing electrode that is placed face to face with the first and second electrodes; and opposing electrode driving means that, during the driving period of the first electrodes, inverts the polarity of electric potential of the opposing electrode in synchronism with a horizontal sync signal having a cycle corresponding to one horizontal screen display period, wherein an induced voltage is exerted in the input means in response to the polarity inversion.

6. The display-integrated type tablet device as defined in claim 5, wherein the operation by which the gate section blocks one portion of the driving signal is carried out during a period other than the transitional response time of the induced voltage responsive to the polarity inversion.

7. The display-integrated type tablet device as defined in claim 5, further comprising:

means for detecting whether the input means is located in the proximity of the transparent substrate in accordance with the inducted voltage responsive to the polarity inversion.

8. The display-integrated type tablet device as defined in claim 1, wherein:

the first positional-information detection means is provided with a first frequency-transmitting means which extracts a signal from the input means with a predetermined frequency band and a first comparison means which detects the first positional information by comparing the signal that has passed through the first frequency-transmitting means with a threshold value, and the second positional-information detection means is provided with a second frequency-transmitting means which extracts a signal from the input means with a predetermined frequency band and a second comparison means which detects the second positional information by comparing the signal that has passed through the second frequency-transmitting means with a threshold value.

9. The display-integrated type tablet device as defined in claim 8, wherein the first or second frequency-transmitting means is set so that in the waveform of each signal that has passed through the frequency-transmitting means, the rate of change in the rising time in the vicinity of the threshold value and the rate of change in the falling time in the vicinity of the threshold value have absolute values that are equal to each other with polarities reversed to each other.

10. The display-integrated type tablet device as defined in claim 8, further comprising:

an opposing electrode that is placed face to face with the first and second electrodes; and opposing electrode driving means that, during the driving period of the first electrodes, inverts the polarity of electric potential of the opposing electrode in synchronism with a horizontal sync signal having a cycle corresponding to one horizontal screen display period, wherein the threshold value of the first comparison means is generated in accordance with the induced voltage in response to the polarity inversion that has been exerted in the input means.

11. The display-integrated type tablet device as defined in claim 1, further comprising:

interfering-noise detection means for detecting interfering noise externally merged during a period other than the driving periods of the first and second electrodes.

12. The display-integrated type tablet device as defined in claim 11, wherein the interfering-noise detection means is provided with third frequency-transmitting means for extracting a noise signal with a predetermined frequency band.

13. The display-integrated type tablet device as defined in claim 12, wherein:

the first positional-information detection means is provided with a first frequency-transmitting means which extracts a signal from the input means with a predetermined frequency band and a first comparison means which detects the first positional information by comparing the signal that has passed through the first frequency-transmitting means with a threshold value, and the second positional-information detection means is provided with a second frequency-transmitting means which extracts a signal from the input means with a predetermined frequency band and a second comparison means which detects the second positional information by comparing the signal that has passed through the second frequency-transmitting means with a threshold value, wherein the first or second frequency-transmitting means is used as the third frequency-transmitting means.

14. The display-integrated type tablet device as defined in claim 12, wherein:

the first positional-information detection means is provided with a first frequency-transmitting means which extracts a signal from the input means with a predetermined frequency band and a first comparison means which detects the first positional information by comparing the signal that has passed through the first frequency-transmitting means with a threshold value, and the second positional-information detection means is provided with a second frequency-transmitting means which extracts a signal from the input means with a predetermined frequency band and a second comparison means which detects the second positional information by comparing the signal that has passed through the second frequency-transmitting means with a threshold value, wherein the frequency characteristics of the first or second frequency-transmitting means is the same as the frequency characteristics of the third frequency-transmitting means.

15. The display-integrated type tablet device as defined in claim 12, wherein the third frequency-transmitting means has a frequency band that is set in accordance with the second positional information.

16. The display-integrated type tablet device as defined in claim 15, wherein the interfering-noise detection means is provided with fourth frequency-transmitting means for extracting a noise signal with a frequency band that is set in accordance with the first positional information.

17. The display-integrated type tablet device as defined in claim 1, wherein the second electrode driving means, upon driving the second electrodes, outputs scanning signals so that a potential change is exerted in each of the second electrodes so as to detect the second positional-information, and also inputs the scanning signals to the corresponding second electrodes so that a potential change is simultaneously generated in at least two of the second electrodes.

18. A display-integrated type tablet device comprising:
 a pair of transparent substrates that are placed face to face with each other with an electro-optical material being interpolated in between;
 a plurality of first electrodes that are disposed on one surface of the transparent substrate in parallel with one another;
 a plurality of second electrodes that are disposed in parallel with one another in a manner orthogonal to the first electrodes;
 first and second electrode driving means for driving the first and second electrodes;
 input means that is electrostatically coupled with the first and second electrodes;
 first positional-information detection means which detects first positional-information that indicates an input position by the input means when the first electrodes are driven;
 second positional-information detection means which detects second positional-information that indicates an input position by the input means when the second electrodes are driven; and
 interfering-noise detection means for detecting interfering noise externally merged during a period other than the driving periods of the first and second electrodes.

19. A display-integrated type tablet device comprising:
 a pair of transparent substrates that are placed face to face with each other with an electro-optical material being interpolated in between;
 a plurality of first electrodes that are disposed on one surface of the transparent substrate in parallel with one another;
 a plurality of second electrodes that are disposed in parallel with one another in a manner orthogonal to the first electrodes;
 first and second electrode driving means for driving the first and second electrodes;
 input means that is electrostatically coupled with the first and second electrodes;
 first positional-information detection means which detects first positional-information that indicates an input position by the input means when the first electrodes are driven; and
 second positional-information detection means which detects second positional-information that indicates an input position by the input means when the second electrodes are driven, wherein: the first positional-information detection means is provided with a first frequency-transmitting means which extracts a signal from the input means with a predetermined frequency band and a first comparison means which detects the first positional information by comparing the signal that has passed through the first frequency-transmitting means with a threshold value, and the second positional-information detection means is provided with a second frequency-transmitting means which extracts a signal from the input means with a predetermined frequency band and a second comparison means which detects the second positional information by comparing the signal that has passed through the second frequency-transmitting means with a threshold value, the first or second frequency-transmitting means being set so that in the waveform of each signal that has passed through the frequency-transmitting means, the rate of change in the rising time in the vicinity of the threshold value and the rate of change in the falling time in the vicinity of the threshold value have absolute values that are equal to each other with polarities reversed to each other.

20. A display-integrated type tablet device comprising:
 a pair of transparent substrates that are placed face to face with each other with an electro-optical material being interpolated in between;
 a plurality of first electrodes that are disposed on one surface of the transparent substrate in parallel with one another;
 a plurality of second electrodes that are disposed in parallel with one another in a manner orthogonal to the first electrodes;
 a plurality of switching elements, each being disposed at an intersecting position between the corresponding first and second electrodes and connected to the corresponding first and second electrodes;
 a plurality of pixel electrodes that are disposed in a matrix form, each being connected to the corresponding switching elements;
 first and second electrode driving means for driving the first and second electrodes;
 input means that is electrostatically coupled with the first and second electrodes;
 first positional-information detection means which, during a display period in which an image is written to the electro-optical material and a resulting display is made by selectively operating the switching elements by allowing the first and second electrode driving means to drive the first and second electrodes, detects first positional-information that indicates an input position by the input means when the first electrodes are driven;
 second positional-information detection means which, during a period except for the display period, detects second positional-information that indicates an input position by the input means when the second electrodes are driven, and
 control means for controlling the first positional-information detection means, wherein: the first electrode driving means is provided with a sequential output section that generates driving signals for displaying images, and that sequentially outputs the driving signals and a gate section that is connected to the sequential output section, and that generates a scanning signal for detecting the first positional information by blocking one portion of the driving signal with a predetermined timing for a period of time that allows the first electrode to have a change in electric potential, and the control means controls the first positional-information detection means in such a manner that the first positional-information detection means allows the signal for obtaining the first positional information to pass for a period of time longer than the time during which the gate section blocks the one portion of the driving signal.

21. A display-integrated type tablet device comprising:

a pair of transparent substrates that are placed face to face with each other with an electro-optical material being interpolated in between;

a plurality of first electrodes that are disposed on one surface of the transparent substrate in parallel with one another;

a plurality of second electrodes that are disposed in parallel with one another in a manner orthogonal to the first electrodes;

a plurality of switching elements, each being disposed at an intersecting position between the corresponding first and second electrodes and connected to the corresponding first and second electrodes;

a plurality of pixel electrodes that are disposed in a matrix form, each being connected to the corresponding switching elements;

first and second electrode driving means for driving the first and second electrodes;

input means that is electrostatically coupled with the first and second electrodes;

first positional-information detection means which, during a display period in which an image is written to the electro-optical material and a resulting display is made by selectively operating the switching elements by allowing the first and second electrode driving means to drive the first and second electrodes, detects first positional-information that indicates an input position by the input means when the first electrodes are driven;

second positional-information detection means which, during a period except for the display period, detects second positional-information that indicates an input position by the input means when the second electrodes are driven; and display control means which generates driving signals for displaying an image, and which also generates a first reference signal that has a cycle equal to the horizontal sync period for image display and that indicates the timing of the polarity inversion of a signal generated in the input means and a second reference signal that has the same cycle as the first reference signal with the different phase therefrom and that indicates the timing for detecting the first positional information so that the phase-difference time of the first and second reference signals is set to be longer than the transitional response time of the signal of the first positional information, wherein the first electrode driving means is provided with a sequential output section that sequentially outputs the driving signals and a gate section that is connected to the sequential output section and that generates a scanning signal for detecting the first positional information by blocking one portion of the driving signal for a period of time that is equal to the pulse width of the second reference signal so that the first electrode has a change in electric potential.

* * * * *

UNITED STATES PATENT AND TRADEMARK OFFICE
CERTIFICATE OF CORRECTION

PATENT NO. : 5,825,345

DATED : October 20, 1998

INVENTOR(S) : Kengo TAKAHAMA, et al

It is certified that error appears in the above-identified patent and that said Letters Patent is hereby corrected as shown below:

On the Title Page, insert Item [30] Foreign Application Priority Data:
----- Aug. 2, 1995 [JP] Japan ..........7-197782 ----.

Signed and Sealed this

Third Day of April, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO.    : 5,825,345
DATED         : October 20, 1998
INVENTOR(S)   : Kengo Takahama, Takao Tagawa and Kiyohiro Nozaki It is certified that error appears in the above-identified patent and that said Letters Patent is hereby corrected as shown below:

<u>Title page,</u>
Insert Item [30] as follows:
-- [30]           Foreign Application
                  Priority Data
Aug. 2, 1995    [JP]    JAPAN . . . . . . . . . . . 7-197782 --

Signed and Sealed this

Thirty-first Day of December, 2002

JAMES E. ROGAN
*Director of the United States Patent and Trademark Office*